United States Patent
Tsai et al.

(10) Patent No.: US 9,237,349 B2
(45) Date of Patent: *Jan. 12, 2016

(54) METHOD AND APPARATUS FOR SLICE COMMON INFORMATION SHARING

(71) Applicant: MEDIATEK INC., Hsin-Chu (TW)

(72) Inventors: Chia-Yang Tsai, New Taipei (TW); Chih-Wei Hsu, Taipei (TW); Yu-Wen Huang, Taipei (TW); Ching-Yeh Chen, Taipei (TW); Chih-Ming Fu, Hsinchu (TW); Shaw-Min Lei, Hsinchu County (TW)

(73) Assignee: MEDIATEK INC, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,599

(22) Filed: Feb. 17, 2015

(65) Prior Publication Data

US 2015/0163488 A1 Jun. 11, 2015

Related U.S. Application Data

(63) Continuation of application No. 13/298,294, filed on Nov. 17, 2011, now Pat. No. 9,001,883.

(60) Provisional application No. 61/443,561, filed on Feb. 16, 2011, provisional application No. 61/454,826, filed on Mar. 21, 2011, provisional application No. 61/508,820, filed on Jul. 18, 2011, provisional application No. 61/528,867, filed on Aug. 30, 2011.

(51) Int. Cl.
*H04N 7/32* (2006.01)
*H04N 19/82* (2014.01)
(Continued)

(52) U.S. Cl.
CPC ........... *H04N 19/117* (2014.11); *H04N 19/136* (2014.11); *H04N 19/172* (2014.11); *H04N 19/174* (2014.11); *H04N 19/70* (2014.11); *H04N 19/82* (2014.11); *H04N 19/86* (2014.11)

(58) Field of Classification Search
CPC . H04N 7/26888; H04N 7/26058; H04N 7/50; H04N 7/26244; H04N 7/26382; H04N 19/70; H04N 19/61; H04N 19/176; H04N 19/46; H04N 19/136; H04N 19/597; H04N 19/105; H04N 19/85

See application file for complete search history.

(56) References Cited

U.S. PATENT DOCUMENTS 6,377,915 B1 * 4/2002 Sasaki ..................... G10L 19/04
704/206
8,059,714 B2 * 11/2011 Segall .................... H04N 19/70
375/240.03

(Continued)

FOREIGN PATENT DOCUMENTS

CN 101543076 9/2009
CN 101656885 2/2010

(Continued)

*Primary Examiner* — Sath V Perungavoor
*Assistant Examiner* — Howard D Brown, Jr.
(74) *Attorney, Agent, or Firm* — McClure, Qualey & Rodack, LLP

(57) ABSTRACT

A method and apparatus for sharing information in a video decoding system are disclosed. The method derives reconstructed data for a picture from a bitstream, where the picture is partitioned into multiple slices. An information-sharing flag is parsed from the bitstream associated with a current reconstructed slice. If the information-sharing flag indicates information sharing, shared information is determined from a part of the bitstream not corresponding to the current reconstructed slice, and in-loop filtering process is applied to the current reconstructed slice according to the shared information. If the information-sharing flag indicates filter no information sharing, individual information is determined from a part of the bitstream corresponding to the current reconstructed slice, and in-loop filtering process is applied to the current reconstructed slice according to the individual information. A method for a corresponding encoder is also disclosed.

11 Claims, 26 Drawing Sheets

(51) Int. Cl.
*H04N 19/117* (2014.01)
*H04N 19/70* (2014.01)
*H04N 19/172* (2014.01)
*H04N 19/174* (2014.01)
*H04N 19/86* (2014.01)
*H04N 19/136* (2014.01)

(56) References Cited

U.S. PATENT DOCUMENTS

| | | | |
|---|---|---|---|
| 8,259,808 B2 | 9/2012 | Lin et al. | |
| 8,532,176 B2* | 9/2013 | Segall | H04N 19/40 375/240.11 |
| 8,538,177 B2* | 9/2013 | Xu | H04N 19/105 382/232 |
| 2008/0056389 A1 | 3/2008 | Chiang et al. | |
| 2009/0110067 A1 | 4/2009 | Sekiguchi et al. | |
| 2009/0257664 A1 | 10/2009 | Kao et al. | |
| 2010/0128803 A1 | 5/2010 | Divorra Escoda et al. | |
| 2010/0135393 A1* | 6/2010 | Ying Gao | H04N 19/00315 375/240.15 |
| 2011/0075732 A1* | 3/2011 | Wada | H04N 19/61 375/240.12 |
| 2011/0235713 A1 | 9/2011 | Hsieh et al. | |
| 2012/0207227 A1* | 8/2012 | Tsai | H04N 19/136 375/240.29 |
| 2013/0044814 A1* | 2/2013 | Guo | H04N 19/105 375/240.12 |
| 2013/0094568 A1 | 4/2013 | Hsu et al. | |
| 2013/0301732 A1 | 11/2013 | Hsu et al. | |
| 2014/0079330 A1 | 3/2014 | Zuo et al. | |

FOREIGN PATENT DOCUMENTS

| | | |
|---|---|---|
| JP | 2010-010760 | 1/2010 |
| RU | 2009 127 749 | 1/2011 |
| WO | WO 2011/008243 | 1/2011 |

\* cited by examiner

| pic_parameter_set_rbsp( ) { | C | Descriptor |
|---|---|---|
|   pic_parameter_set_id | 1 | ue(v) |
|   seq_parameter_set_id | 1 | ue(v) |
|   ... | | |
|   pps_use_more_pps_info_flag | 1 | u(1) |
|   if( pps_use_more_pps_info_flag ) { | | |
|     pps_info( ) | | |
|     pps_alf_param( ) | | |
|   } | | |
| } | | |

*Fig. 5A*

| pps_info( ) { | C | Descriptor |
|---|---|---|
|   ... // non-ALF syntax elements that can be shared by multiple slices | | |
| } | | |

*Fig. 5B*

| pps_alf_param ( ) { | C | Descriptor |
|---|---|---|
|   adaptive_loop_filter_flag | 1 | u(1) |
|   if( adaptive_loop_filter_flag ) { | | |
|     ... // filter size, coefficients, ...; filter on/off flags NOT included | | |
|   } | | |
| } | | |

*Fig. 5C*

| slice_header( ) { | C | Descriptor |
|---|---|---|
|   pic_parameter_set_id | 2 | ue(v) |
|   if( !pps_use_more_pps_info_flag ) { | | |
|     slice_info( ) | | |
|     slice_alf_param( ) | | |
|   } | | |
|   alf_cu_control_param( ) | | |
| } | | |

*Fig. 5D*

| slice_info( ) { | C | Descriptor |
|---|---|---|
|   ... // non-ALF syntax elements | | |
| } | | |

*Fig. 5E*

| slice_alf_param ( ) { | C | Descriptor |
|---|---|---|
|   adaptive_loop_filter_flag | 2 | u(1) |
|   if( adaptive_loop_filter_flag ) { | | |
|     ... // filter size, coefficients, ...; filter on/off flags NOT included | | |
|   } | | |
| } | | |

*Fig. 5F*

| alf_cu_control_param ( ) { | C | Descriptor |
|---|---|---|
|   if( adaptive_loop_filter_flag ) | | |
|     alf_cu_control_flag | 2 | u(1)\|ae(v) |
|     if( alf_cu_control_flag) { | | |
|       alf_cu_control_max_depth | 2 | ue(v)\|ae(v) |
|       num_of_alf_cu_control_flags | 2 | ue(v)\|ae(v) |
|       for( i = 0; i < num_of_alf_cu_control_flags; i++ ) | | |
|         alf_onoff_flag | 2 | u(1)\|ae(v) |
|       } | | |
|     } | | |
| } | | |

*Fig. 5G*

| seq_parameter_set_rbsp( ) { | C | Descriptor |
|---|---|---|
|   seq_parameter_set_id | 1 | ue(v) |
|   ... | | |
|   sps_use_more_pps_info_flag | 1 | u(1) |
| } | | |

*Fig. 6A*

| pic_parameter_set_rbsp( ) { | C | Descriptor |
|---|---|---|
|   pic_parameter_set_id | 1 | ue(v) |
|   seq_parameter_set_id | 1 | ue(v) |
|   ... | | |
|   if( sps_use_more_pps_info_flag ) { | | |
|     pps_info( ) | | |
|     pps_alf_param( ) | | |
|   } | | |
| } | | |

*Fig. 6B*

| slice_header( ) { | C | Descriptor |
|---|---|---|
|   pic_parameter_set_id | 2 | ue(v) |
|   if( !sps_use_more_pps_info_flag ) { | | |
|     slice_info( ) | | |
|     slice_alf_param( ) | | |
|   } | | |
|   alf_cu_control_param( ) | | |
| } | | |

*Fig. 6C*

| pic_parameter_set_rbsp( ) { | C | Descriptor |
|---|---|---|
|   pic_parameter_set_id | 1 | ue(v) |
|   seq_parameter_set_id | 1 | ue(v) |
|   ... | | |
|   pps_info( ) | | |
|   pps_alf_param( ) | | |
| } | | |

*Fig. 7A*

| slice_header( ) { | C | Descriptor |
|---|---|---|
|   pic_parameter_set_id | 2 | ue(v) |
|   sh_use_more_pps_info_flag | 2 | u(1) |
|   if( !sh_use_more_pps_info_flag ) { | | |
|     slice_info( ) | | |
|     slice_alf_param( ) | | |
|   } | | |
|   alf_cu_control_param( ) | | |
| } | | |

*Fig. 7B*

| slice_header( ) { | C | Descriptor |
|---|---|---|
|   pic_parameter_set_id | 2 | ue(v) |
|   ShUseMorePpsInfo = 0 | | |
|   if( pps_use_more_pps_info_flag ) | | |
|     ShUseMorePpsInfo = sh_use_more_pps_info_flag | 2 | u(1) |
|   if( !ShUseMorePpsInfo ) { | | |
|     slice_info( ) | | |
|     slice_alf_param( ) | | |
|   } | | |
|   alf_cu_control_param( ) | | |
| } | | |

*Fig. 8*

| slice_header( ) { | C | Descriptor |
|---|---|---|
|   pic_parameter_set_id | 2 | ue(v) |
|   ShUseMorePpsInfo = 0 | | |
|   if( sps_use_more_pps_info_flag ) | | |
|     ShUseMorePpsInfo = sh_use_more_pps_info_flag | 2 | u(1) |
|   if( !ShUseMorePpsInfo ) { | | |
|     slice_info( ) | | |
|     slice_alf_param( ) | | |
|   } | | |
|   alf_cu_control_param( ) | | |
| } | | |

*Fig. 9*

| pic_parameter_set_rbsp( ) { | C | Descriptor |
|---|---|---|
|   pic_parameter_set_id | 1 | ue(v) |
|   seq_parameter_set_id | 1 | ue(v) |
|   ... | | |
|   PpsUseMorePpsInfo = 0 | | |
|   if( sps_use_more_pps_info_flag ) | | |
|     PpsUseMorePpsInfo = pps_use_more_pps_info_flag | 1 | u(1) |
|   if( PpsUseMorePpsInfo ) { | | |
|     pps_info( ) | | |
|     pps_alf_param( ) | | |
|   } | | |
| } | | |

*Fig. 10A*

| slice_header( ) { | C | Descriptor |
|---|---|---|
|   pic_parameter_set_id | 2 | ue(v) |
|   if( !PpsUseMorePpsInfo ) { | | |
|     slice_info( ) | | |
|     slice_alf_param( ) | | |
|   } | | |
|   alf_cu_control_param( ) | | |
| } | | |

*Fig. 10B*

| slice_header( ) { | C | Descriptor |
|---|---|---|
| pic_parameter_set_id | 2 | ue(v) |
| ShUseMorePpsInfo = 0 | | |
| if( PpsUseMorePpsInfo ) | | |
|    ShUseMorePpsInfo = sh_use_more_pps_info_flag | 2 | u(1) |
| if( !ShUseMorePpsInfo ) { | | |
|    slice_info( ) | | |
|    slice_alf_param( ) | | |
|    } | | |
| alf_cu_control_param( ) | | |
| } | | |

*Fig. 11*

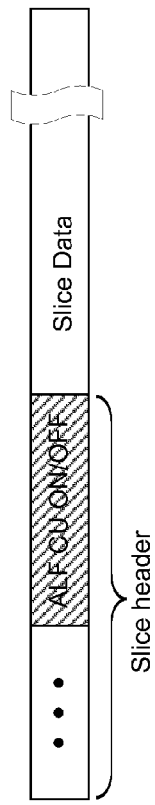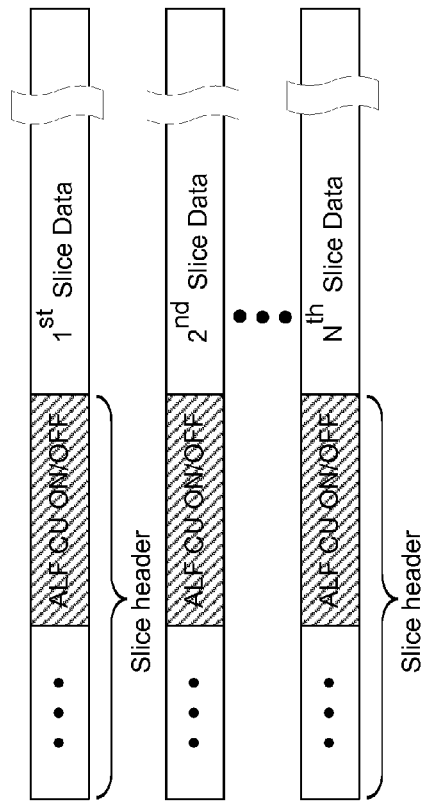
Fig. 16A
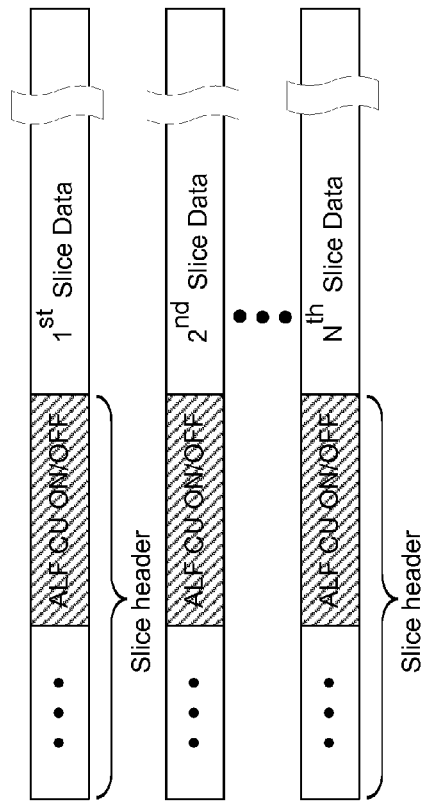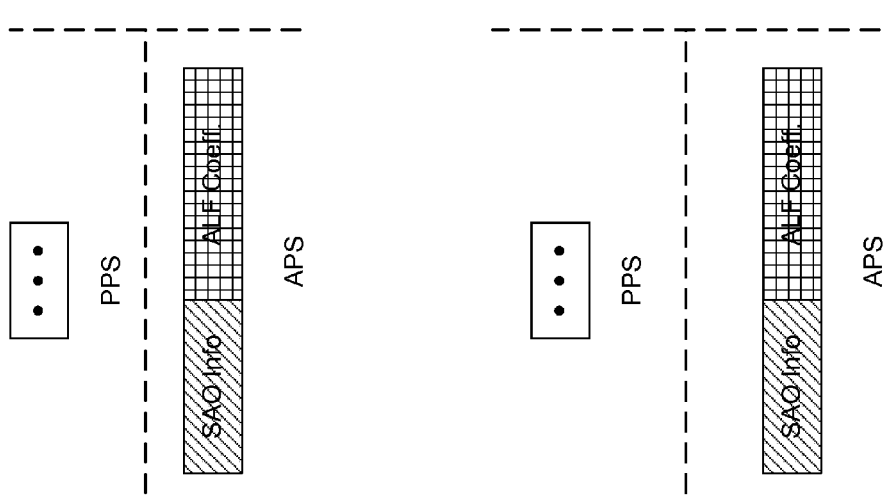
Fig. 16B

| slice_header( ) { | Descriptor |
|---|---|
| ......... | |
| if( sample_adaptive_offset_enabled_flag \|\| adaptive_loop_filter_enabled_flag ) | |
|    aps_id | |
| ....... | |
|    if( adaptive_loop_filter_enabled_flag && aps_adaptive_loop_filter_flag ) { | |
|       byte_align() | |
|    alf_cu_control_param( ) | |
|       byte_align() | |
|   } | |
| } | |

*Fig. 17*

| slice_header( ) { | Descriptor |
|---|---|
| ... | ue(v) |
| if( sample_adaptive_offset_enabled_flag ) | |
|    SAO_aps_id | ue(v) |
| if( adaptive_loop_filter_enabled_flag ) | |
|    ALF_aps_id | ue(v) |
| ... | |
| } | |

*Fig. 21*

| aps_parameter_set_rbsp( ) { | Descriptor |
|---|---|
| aps_parameter_set_id | ue(v) |
| ... | |
| //SAO related parameters | |
| SAO_param() | |
| //ALF related parameters | |
| ALF_param() | |
| ... | |
| rbsp_trailing_bits( ) | |
| } | |

*Fig. 22*

| aps_sao_parameter_set_rbsp( ) { | Descriptor |
|---|---|
| aps_sao_parameter_set_id | ue(v) |
| ... | |
| //SAO related parameters | |
| SAO_param() | |
| ... | |
| rbsp_trailing_bits( ) | |
| } | |

*Fig. 24*

| aps_alf_parameter_set_rbsp( ) { | Descriptor |
|---|---|
| aps_alf_parameter_set_id | ue(v) |
| ... | |
| //ALF related parameters | |
| ALF_param() | |
| ... | |
| rbsp_trailing_bits( ) | |
| } | |

*Fig. 25*

| sequence_parameter_set( ) { | Descriptor |
|---|---|
| ... | |
| multiple_aps_ids_enabled_flag | u(1) |
| ... | |
| } | |

*Fig. 26*

| slice_header( ) { | Descriptor |
|---|---|
| ... | ue(v) |
| if( multiple_aps_ids_enabled_flag ) { | |
|    if( sample_adaptive_offset_enabled_flag ) | |
|      SAO_aps_id | ue(v) |
|    if( adaptive_loop_filter_enabled_flag ) | |
|      ALF_aps_id | ue(v) |
| } else { | |
|    if( sample_adaptive_offset_enabled_flag \|\| adaptive_loop_filter_enabled_flag) { | |
|      ndf_aps_id | ue(v) |
|    } | |
| } | |
| ... | |
| } | |

*Fig. 27*

METHOD AND APPARATUS FOR SLICE COMMON INFORMATION SHARING

CROSS REFERENCE TO RELATED APPLICATIONS

The present invention is a continuation of U.S. Non-provisional patent application Ser. No. 13/298,294, filed on Nov. 17, 2011, "Method and Apparatus for Slice Common Information Sharing", which claims priority to U.S. Provisional Patent Application Ser. No. 61/443,561, filed Feb. 16, 2011, entitled "Syntax Design for Common Slice Information Sharing", U.S. Provisional Patent Application Ser. No. 61/454,826, filed Mar. 21, 2011, entitled "Slice Common Information Sharing", U.S. Provisional Patent Application Ser. No. 61/508,820, filed Jul. 18, 2011, entitled "The Adaptation of In-loop Filter Parameters", and U.S. Provisional Patent Application Ser. No. 61/528,867, filed Aug. 30, 2011, entitled "Adaptation of In-loop Filter Parameters". The present invention is also related to U.S. patent application Ser. No. 12/978,490, entitled "Method and Apparatus of Slice Boundary Filtering for High Efficiency Video Coding", filed Dec. 24, 2010. The U.S. Provisional Patent Applications and the U.S. patent application are hereby incorporated by reference in their entireties.

FIELD OF THE INVENTION

The present invention relates to video coding. In particular, the present invention relates to coding techniques to enable a coding system to share common slice information.

BACKGROUND

Motion compensated inter-frame coding has been widely adopted in various coding standards, such as MPEG-1/2/4 and H.261/H.263/H.264/AVC. Motion estimation and compensation as well as subsequent processing are applied to the video data on a block basis. During the compression process, coding noises may arise due to lossy operations such as quantization. The coding artifacts may become noticeable in the reconstructed video data, especially at or near block boundaries. In order to alleviate the visibility of coding artifacts, a technique called de-blocking has been used in newer coding systems such as H.264/AVC and the High Efficiency Video Coding (HEVC) system. The de-blocking process applies spatial filtering across block boundaries adaptively to smooth the large transitions at and near block boundaries due to coding noises while retaining image sharpness. In the recent HEVC development, two new in-loop processing tools, named adaptive loop filtering (ALF) and sample adaptive offset (SAO), are being adopted to process de-blocked video data, where a spatial linear 2-D filter has been used for the ALF.

In HEVC Test Model Version 3.0 (HM-3.0), the conventional ALF can be selectively turned ON or OFF for each block in a picture. In the case where the picture contains only one slice, the ALF information and non-ALF-filter common information are incorporated in the slice header. When the picture contains multiple slices, the syntax design according to HEVC incorporates the ALF information and non-ALF common information in the first slice header. Also the non-ALF common information is incorporated in all other slice headers. Consequently, the non-ALF common information in all other slice headers may be redundant. Furthermore, syntax structure according to the current HEVC may suffer long delay in case of out-of-order transmission and late arrival of the first slice. In addition, incorporation of the ALF information in the first slice is hard for parallel decoding process since each of the parallel paths will have to obtain ALF information from the first slice. Therefore, it is desirable to develop a system and associated syntax structure that allows the slices to adaptively share the non-ALF common information and the ALF information among slices.

BRIEF SUMMARY OF THE INVENTION

A method and apparatus for sharing information in a video decoding system are disclosed. In one embodiment according to the present invention, the method and apparatus for sharing information in a video decoding system derive reconstructed data for a picture from a bitstream, where the picture is partitioned into multiple slices. An information-sharing flag is parsed from the bitstream associated with a current reconstructed slice. If the information-sharing flag indicates information sharing, shared information is determined from a part of the bitstream not corresponding to the current reconstructed slice, and in-loop filtering process is applied to the current reconstructed slice according to the shared information. If the information-sharing flag indicates filter no information sharing, individual information is determined from a part of the bitstream corresponding to the current reconstructed slice, and in-loop filtering process is applied to the current reconstructed slice according to the individual information. The in-loop filtering process may correspond to sample adaptive offset (SAO), adaptive loop filter (ALF) or a combination thereof.

In another embodiment according to the present invention, the method for sharing information in a video decoding system receives reconstructed data for a picture, where the picture is partitioned into multiple slices. The method then determines whether to use shared information for a current reconstructed slice. If the shared information is used for the current reconstructed slice, in-loop filtering process is applied to the current reconstructed slice according to the shared information and an information-sharing flag is signaled to indicate information sharing for the current reconstructed slice. If the shared information is not used for the current reconstructed slice, the in-loop filtering process is applied to the current reconstructed slice according to individual information and the information-sharing flag is signaled to indicate no information sharing for the current reconstructed slice.

BRIEF DESCRIPTION OF THE DRAWINGS

FIG. 5A illustrates the first exemplary PPS syntax design according to an embodiment of the present invention.

FIG. 5B illustrates the first exemplary pps_info( ) syntax design according to an embodiment of the present invention.

FIG. 5C illustrates the first exemplary pps_alf_param( ) syntax design according to an embodiment of the present invention.

FIG. 5D illustrates the first exemplary slice_header( ) syntax design according to an embodiment of the present invention.

FIG. 5E illustrates the first exemplary slice_info( ) syntax design according to an embodiment of the present invention.

FIG. 5F illustrates the first exemplary slice_alf_param( ) syntax design according to an embodiment of the present invention.

FIG. 5G illustrates the first exemplary alf_cu_control_param( ) syntax design according to an embodiment of the present invention.

FIG. 6A illustrates the second exemplary SPS syntax design according to an embodiment of the present invention.

FIG. 6B illustrates the second exemplary PPS syntax design according to an embodiment of the present invention.

FIG. 6C illustrates the second exemplary slice_header( ) syntax design according to an embodiment of the present invention.

FIG. 7A illustrates the third exemplary PPS syntax design according to an embodiment of the present invention.

FIG. 7B illustrates the third exemplary slice_header( ) syntax design according to an embodiment of the present invention.

FIG. 8 illustrates the fourth exemplary slice_header( ) syntax design according to an embodiment of the present invention.

FIG. 9 illustrates the fifth exemplary slice_header( ) syntax design according to an embodiment of the present invention.

FIG. 10A illustrates the sixth exemplary PPS syntax design according to an embodiment of the present invention.

FIG. 10B illustrates the sixth exemplary slice_header( ) syntax design according to an embodiment of the present invention.

FIG. 11 illustrates the seventh exemplary slice_header( ) syntax design according to an embodiment of the present invention.

FIG. 16A illustrates an exemplary data structure incorporating APS according to one embodiment of the present invention for a one-slice picture.

FIG. 16B illustrates exemplary data structure incorporating APS according to one embodiment of the present invention for a multiple-slice picture.

FIG. 17 illustrates an example of slice syntax design to support APS according to one embodiment of the present invention.

FIG. 21 illustrates an exemplary slice header syntax that allows the slice to select separate filter information for SAO and ALF from multiple APSs.

FIG. 22 illustrates an exemplary APS syntax, where the APS identification includes an APS identifier and filter parameters for both SAO and ALF.

FIG. 24 illustrates an exemplary APS syntax for SAO in the SAO APS Group where the APS syntax includes an APS ID and SAO parameters.

FIG. 25 illustrates an exemplary APS syntax for ALF in the ALF APS Group where the APS syntax includes an APS ID and ALF parameters.

FIG. 26 illustrates exemplary SPS syntax including a flag to indicate whether multiple APSs are enabled.

FIG. 27 illustrates exemplary slice header syntax to support the flag for indicating whether multiple APSs are enabled.

DETAILED DESCRIPTION OF THE INVENTION

For digital video compression, motion compensated inter-frame coding is an effective compression technique and has been widely adopted in various coding standards, such as MPEG-1/2/4 and H.261/H.263/H.264/AVC. In a motion compensated system, motion estimation/compensation and subsequent compression is often performed on a block by block basis. During compression process, coding noises may arise due to lossy operations applied such as quantization. The coding artifacts may become noticeable in the reconstructed video data, especially at or near block boundaries. In order to alleviate the visibility of coding artifacts, a technique called de-blocking has been used in newer coding systems such as H.264/AVC and the High Efficiency Video Coding (HEVC) system. The de-blocking process applies spatial filtering across block boundaries adaptively to smooth the large transitions at and near block boundaries due to coding noises while retaining image sharpness. Furthermore, due to the nature of inter-frame coding, the de-blocking process is configured for in-loop operation.

Figure 1:
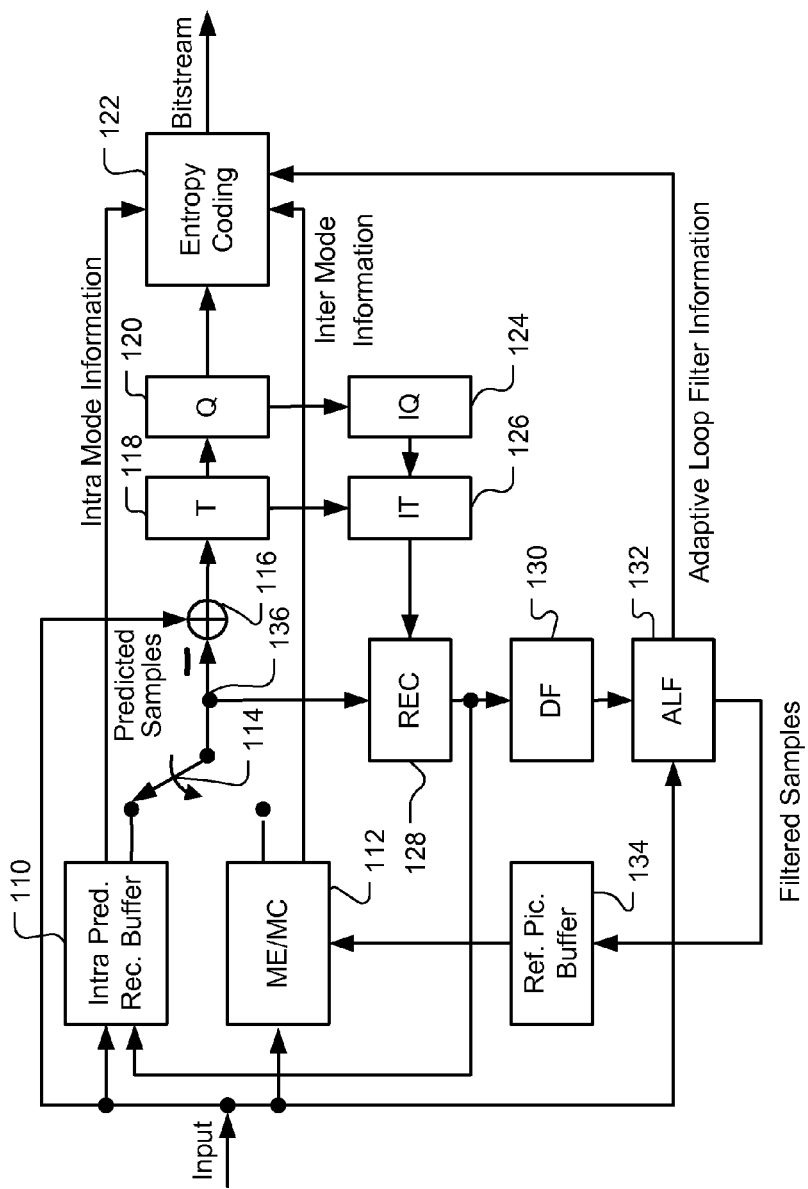
FIG. 1 illustrates an exemplary block diagram of a video encoder system based on motion compensated prediction, where adaptive loop filter is incorporated to restore de-blocked video.

The exemplary encoder shown in FIG. 1 represents a High Efficiency Video Coding (HEVC) system using intra/inter-prediction. Intra-prediction 110 is responsible for providing prediction data based on video data in the same picture. For inter-prediction, motion estimation (ME) and motion compensation (MC) 112 is used to provide prediction data based on video data previously reconstructed. Switch 114 selects intra-prediction or inter-prediction data and the selected prediction data are supplied to adder 116 to form prediction errors, also called residues. The prediction error is then processed by transformation (T) 118 followed by quantization (Q) 120. The transformed and quantized residues are than coded by entropy coding 122 to form a bitstream corresponding to the compressed video data. The bitstream associated with the quantized transform coefficients is then packed with side information such as motion, mode, and other information associated with the image area. The side information may also be subject to entropy coding to reduce required bandwidth and accordingly the data associated with the side information are provided to entropy coding 122 as shown in FIG. 1. When an inter-prediction mode is used, a reference picture or reference pictures have to be reconstructed at the encoder side. Consequently, the transformed and quantized residues are processed by inverse quantization (IQ) 124 and inverse transformation (IT) 126 to recover the residues. The residues are then added back to prediction data 136 at reconstruction (REC) 128 to reconstruct video data. The reconstructed video data may be stored in reference picture buffer 134 and used for prediction of other frames. However, de-blocking filter 130 and adaptive loop filter (ALF) 132 are applied to the reconstructed video data before the video data are stored in the reference picture buffer in order to improve video quality. The adaptive loop filter information may have to be transmitted in the bitstream so that a decoder can properly recover the required information in order to apply the adaptive loop filter. Therefore, adaptive loop filter information from ALF 132 is provided to entropy coding 122 for incorporation into the final bitstream. In the following descriptions, ALF information may include ALF parameters related to coefficients and ALF parameters related to ON/OFF control. ALF coefficients related parameters comprise filter coefficients, and may also comprise parameters representing how the prediction is performed using multiple filters, merge method for multiple filters, filter size, and filter shape. ALF ON/OFF control related parameters comprise CU-based ON/OFF control flags, and may also comprise parameters representing ON/OFF control block size and number of ALF ON/OFF control flags.

Figure 2:
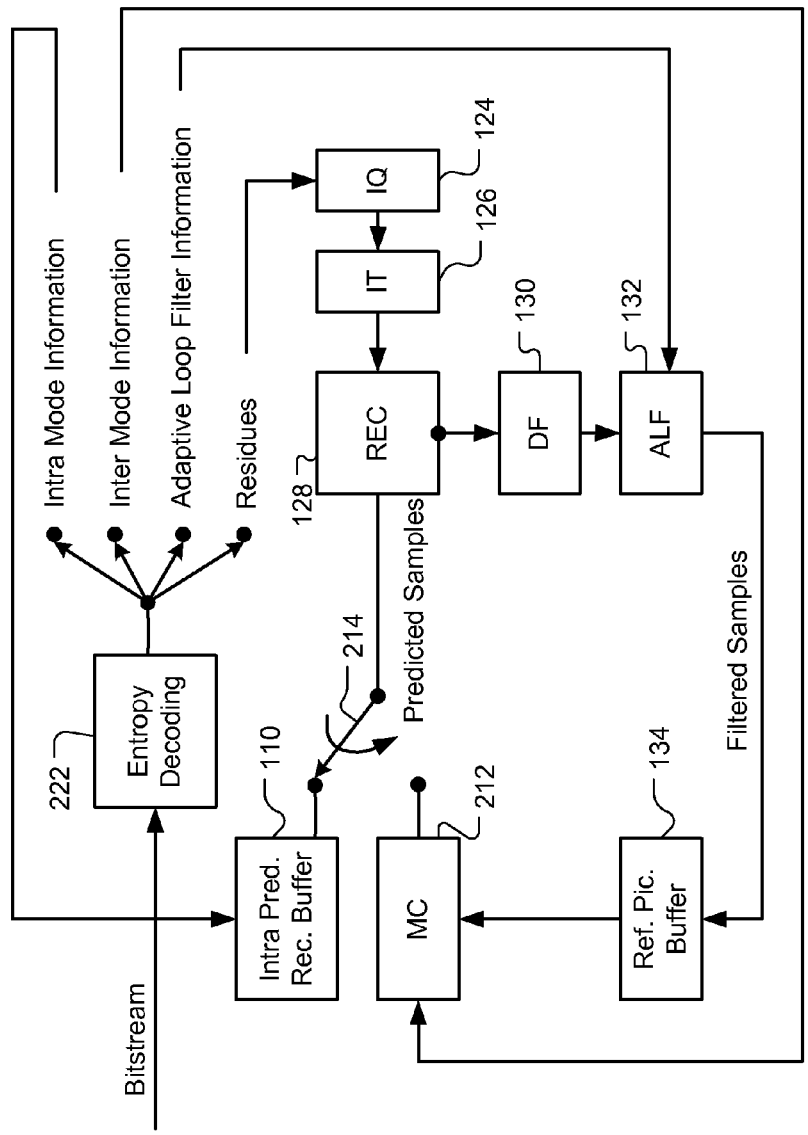
FIG. 2 illustrates an exemplary block diagram of a video decoder system based on motion compensated prediction, where adaptive loop filter is incorporated to restore de-blocked video.

FIG. 2 illustrates a system block diagram of a video decoder for High Efficiency Video Coding. Since the encoder also contains parts for reconstructing the video data, some decoder parts are already described in the encoder. However, entropy decoder 222 is not used by the encoder. Furthermore, only motion compensation 212 is required for the decoder side. The switch 214 selects intra-prediction or inter-prediction and the selected prediction data are supplied to reconstruction (REC) 128 to be combined with recovered residues. Besides performing entropy decoding for compressed video data, entropy decoding 222 is also responsible for entropy decoding of side information and provides the side information to respective blocks. For example, intra mode information is provided to intra-prediction 110; inter mode information is provided to motion compensation 212; adaptive loop filter information is provided to ALF 132; and residues are provided to inverse quantization (IQ) 124. Inverse quantization 124 and inverse transform (IT) 126 recover the residues and provide the recovered residue for reconstruction. Subsequent reconstruction 128 reconstructs the video data based on the prediction signal and the recovered residue signal. The reconstructed video data from REC 128 undergo further processing including de-blocking filter 130 and adaptive loop filter 132.

The adaptive loop filter (ALF) adopted by original HEVC applies a linear spatial filter to process de-blocked reconstruction frames, where the ALF is selectively turned ON or OFF for each block. The block size and block shape can be adaptive, and the information of block size and block shape can be explicitly sent to decoders or implicitly derived by decoders. According to a performance criterion, the video encoder will determine whether a block is subject to ALF or not, and uses an ALF flag to signal the ON/OFF decision for each block so that a decoder can apply ALF accordingly. Typical ALF is a linear spatial filter where the filter is specified by its coefficients. Filter information such as coefficients can be incorporated in the bitstream so that a decoder may recover filter information and apply the ALF accordingly.

In HEVC Test Model Version 3.0 (HM-3.0), one picture can be partitioned into multiple slices and ALF parameters are incorporated in the picture level. The slice partition may be LCU aligned. Syntax structure according to the current HEVC always packs the entire ALF information in the first slice header. Syntax structure according to the current HEVC may suffer long delay in case of out-of-order transmission and late arrival of the first slice. Furthermore, incorporation of the ALF information in the first slice is difficult for parallel decoding process since each of the parallel paths will have to obtain ALF information from the first slice. In U.S. patent application Ser. No. 12/978,490, entitled "Method and Apparatus of Slice Boundary Filtering for High Efficiency Video Coding", filed Dec. 24, 2010, discloses slice-independent de-blocking filter (DF) and ALF where DF and ALF processes are not performed across slice boundaries. Accordingly, ALF processing based on U.S. patent application Ser. No. 12/978,490 enables independent slice encoding or decoding.

Figure 3A:
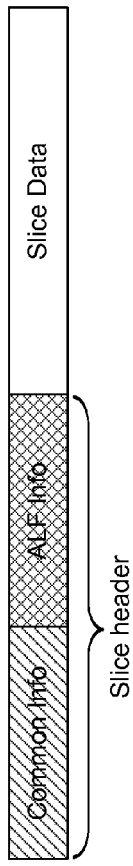
FIG. 3A illustrates an example of syntax structure of slice header according to HEVC, where the picture includes a single slice.
Figure 3B:
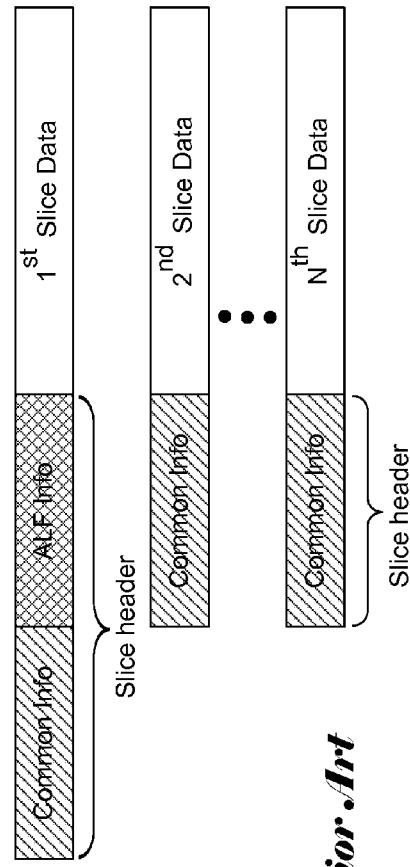
FIG. 3B illustrates an example of syntax structure of slice header according to HEVC, where the picture includes multiple slices.

The slice syntax structure according to an old version of HEVC is shown in FIG. 3A for a picture consisting of one slice. As shown in FIG. 3A, the slice header comprises common information and ALF information. The ALF information comprises information related to the ALF such as ALF coefficients related parameters and ON/OFF control related parameters. The common information comprises non-ALF related information associated with the slice. Examples of the common information may include coding mode and quantization parameter (QP) for the slice. In HEVC Test Model Version 2.0 (HM-2.0), a picture can be partitioned into multiple LCU-aligned slices, and the ALF parameters are adapted at picture level. As shown in FIG. 3B, the syntax associated with ALF information is located in the first slice header of the picture. Each subsequent slice comprises a slice header and slice data payload, where the slice header comprises common information. The common information comprises non-ALF related information such as coding mode and quantization parameters. This syntax design may cause huge decoding delay in case of out-of-order slice delivery and substantial late arrival of the first slice. In addition, the common information is included in every slice header and may cause redundancy. Furthermore, since all ALF information is located in the first slice, it is difficult for parallel slice decoding. Therefore, it is desirable to develop a new system associated with new syntax structure that enables parallel ALF processing as well as eliminates un-necessary redundancy. Furthermore, it is desirable to enable a slice to adaptively use the common information and/or the ALF information in the picture level or use its own common information and/or the ALF information in the slice header.

Figure 4:
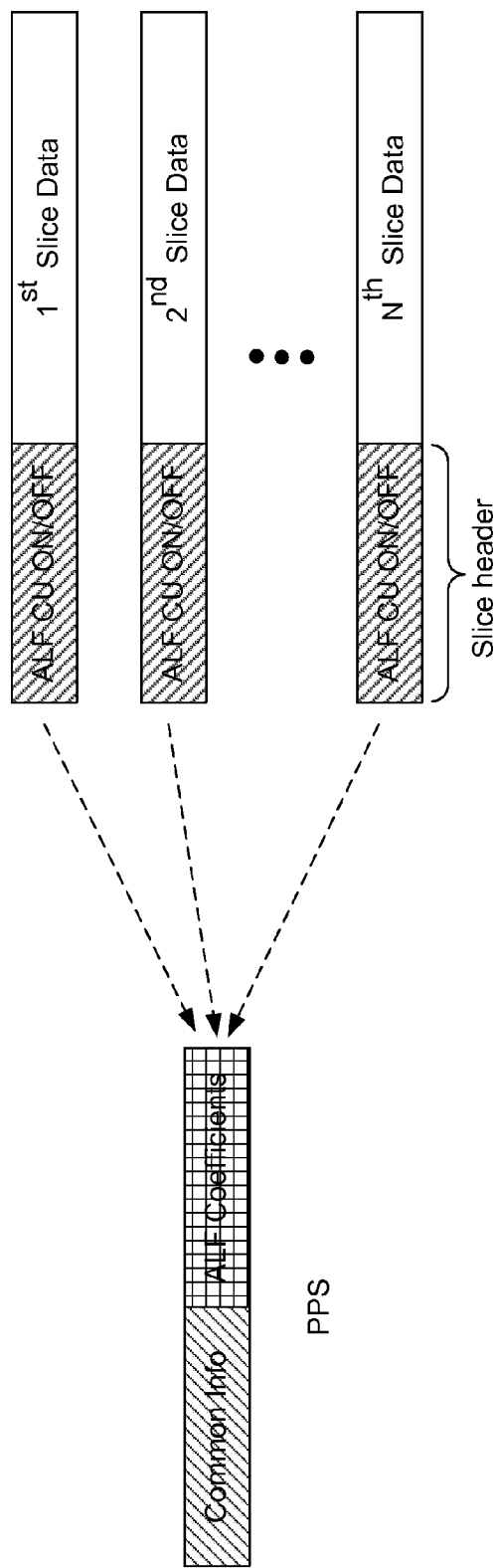
FIG. 4 illustrates an example of syntax structure of PPS and slice header, where multiple slices share common information/ALF parameters in the PPS and each of the multiple slices has its own CU ON/OFF control related parameters in the slice header according to an embodiment of the present invention.

Accordingly, an information sharing technique and associated syntax design is developed to allow parallel ALF processing as well as eliminates un-necessary redundancy of common information in the slice header. It also allows a slice to adaptively use the common information and/or the ALF information in the picture level or use its own common information and/or the ALF information in the slice header. A syntax structure incorporating an embodiment according to the present invention is illustrated in FIG. 4. In order to remove redundancy, the common information is moved from multiple slice headers to the picture header, i.e. Picture Parameter Set (PPS). For better support of parallel slice processing, the ALF coefficients are relocated from the first slice header to the PPS, and each slice header contains its own ALF coding unit (CU) ON/OFF control related parameters. Consequently, all slices of a picture share the same common information and ALF coefficients related parameters in the picture header. The sharing technique may result in a slight bit increase due to the byte alignment stuffing bits caused by distributing ALF CU ON/OFF control related parameters in all slice headers. For a coding system where the picture only has one slice, slice information sharing can be disabled. In other words, both the ALF information and slice common information are incorporated in the slice header. Syntax can be designed to signal whether slice information sharing is enabled or disabled.

A first example of syntax design incorporating an embodiment according to the present invention is shown in FIG. 5A through FIG. 5G, where a flag in the picture level is used to indicate whether to share information in the picture level. As shown in FIG. 5A, pps_use_more_pps_info_flag is incorporated in the picture parameter set (PPS). When pps_use_more_pps_info_flag has a value equal to 0, it indicates no information sharing and accordingly pps_info( ) and pps_alf_param( ) are not transmitted in the PPS. In this case, slice_info( ) and slice_alf_param( ) are transmitted in the slice header so that each slice uses its own non-ALF information and ALF parameters. On the other hand, when pps_use_more_pps_info_flag has a value equal to 1, it indicates information sharing and accordingly pps_info( ) and pps_alf_param( ) are transmitted in the PPS. In this case, slice_info( ) and slice_alf_param( ) are not included in the slice header. When a picture has only one slice, pps_use_more_pps_info_flag can be set to 0 so that slice_info( ) and slice_alf_param( ) will be included in the slice header. When a picture has multiple slices, pps_use_more_pps_info_flag can be set to 1 so that that pps_info( ) and pps_alf_param( ) will be included in the PPS to allow slice information sharing. The PPS shown in FIG. 5A also comprises a PPS ID pic_parameter_set_id and a SPS ID seq_parameter_set_id.

FIG. 5B illustrates an example of syntax pps_info( ), where pps_info( ) includes non-ALF syntax elements to be shared by multiple slices. Syntax pps_info( ) may include one or more syntax elements selected from a group consisting of slice type, picture level quantization parameter (QP), entropy coding mode, control flag to enable/disable de-blocking filter, reference picture information such as reference picture indexes and reference picture ordering, and pixel value offset information. The offset can be derived based on different classification methods, for example, DC value, edge orientation, pixel intensity, and other types of offset that can be derived in both encoding and decoding process. FIG. 5C illustrates an example of syntax pps_alf_param( ), where pps_alf_param( ) includes a syntax element adaptive_loop_filter_flag. When adaptive_loop_filter_flag has a value equal to 0, it denotes that adaptive loop filtering (ALF) is disabled. When adaptive_loop_filter_flag has a value equal to 1, it denotes that adaptive loop filtering (ALF) is enabled and filter information is incorporated in pps_alf_param( ).

FIG. 5D illustrates an example of syntax slice_header( ). As mentioned before, if pps_use_more_pps_info_flag has a value equal to 0, slice_info( ) and slice_alf_param( ) are included in the slice header; otherwise, slice_info( ) and slice_alf_param( ) will not be included in the slice header. If pps_use_more_pps_info_flag has a value equal to 1, the ALF coefficients related parameters and non-ALF information for the slice will be derived from the PPS. The slice header always includes the syntax alf_cu_control_param ( ) corresponding to the ALF coding unit (CU) control parameters as shown in FIG. 5D. FIG. 5E and FIG. 5F illustrate exemplary syntax for slice_info( ) and slice_alf_param( ). The syntax slice_info( ) includes non-ALF information. The syntax slice_alf_param( ) may include ALF coefficients related parameters such as filter size and filter coefficients if ALF is enabled as indicated by adaptive_loop_filter_flag=1. As shown in FIG. 5F, filter ON/OFF control flags are not incorporated in slice_alf_param( ).

FIG. 5G illustrates an exemplary syntax alf_cu_control_param( ). When ALF is enabled as indicated by adaptive_loop_filter_flag=1, alf_cu_control_flag is incorporated in alf_cu_control_para( ). If alf_cu_control_flag has a value equal to 0, it indicates that the luma component of the slice has no CU ON/OFF control related parameters; otherwise the CU ON/OFF control related parameters are included. When CU ON/OFF control related parameters are included, the luma component corresponding to the CU control regions with "ON" flags will be filtered. The CU ON/OFF control related parameters are associated with syntax elements alf_cu_control_max_depth, num_of alf_cu_control_flags, and alf_onoff_flag. Syntax element alf_cu_control_max_depth specifies the maximum split depth from the LCU for deciding the CU control region size in ALF. Syntax element num_of_alf_cu_control_flags specifies the number of CU ON/OFF flags. This number may be predicatively coded so that the prediction error is transmitted in order to conserve bandwidth. When syntax element alf_onoff_flag has a value equal to 0, it indicates that the CU region will not be filtered; otherwise the CU region will be filtered.

While the exemplary syntax design as shown in FIG. 5A through FIG. 5G uses a flag pps_use_more_pps_info_flag in the picture level to indicate whether slice information sharing is used, an information sharing flag may also be incorporated in the sequence level to indicate whether slice information sharing is used. The second example of syntax design incorporating an embodiment according to the present invention is shown in FIG. 6A through FIG. 6C. The syntax design for pps_info( ), pps_alf_param( ), slice_info( ), slice_alf_param( ), and alf_cu_control_param( ) are the same as those in FIGS. 5B-C and FIGS. 5E-G, and therefore the syntax design for these syntax elements are not repeated. FIG. 6A illustrates an exemplary sequence header syntax incorporating. The flag sps_use_more_pps_info_flag is used to indicate information sharing. When sps_use_more_pps_info_flag has a value equal to 0, it indicates no information sharing and accordingly syntax elements pps_info( ) and pps_alf_param( ) will not included in the PPS as shown in FIG. 6B. In this case, individual syntax elements slice_info( ) and slice_alf_param( ) are incorporated in the slice header so that each slice can use an individual ALF as shown in FIG. 6C. When sps_use_more_pps_info_flag has a value equal to 1, it indicates information sharing and accordingly syntax elements pps_info( ) and pps_alf_param( ) are included in the PPS and can be shared by all slices. In this case, slice_info( ) and slice_alf_param( ) will not be included in the slice header.

The SPS also includes a SPS ID seq_parameter_set_id as shown in FIG. 6A. FIG. 6B illustrates an exemplary PPS syntax collaborating with the sequence level syntax of FIG. 6A to support information sharing. The PPS syntax of FIG. 6B is similar to the PPS syntax of FIG. 5A except that the sequence level flag sps_use_more_pps_info_flag is used to replace the picture level flag pps_use_more_pps_info_flag. FIG. 6C illustrates a syntax design for slice header similar to the slice header design of FIG. 5D except that the sequence level flag sps_use_more_pps_info_flag, is used instead of the picture level flag pps_use_more_pps_info_flag, to determine whether slice_info( ) and slice_alf_param( ) exist in the slice header. Accordingly, the second exemplary syntax design illustrates a case of using a sequence level flag to indicate whether to share information.

While the first exemplary syntax design in FIGS. 5A-G illustrates information sharing according to the flag pps_use_more_pps_info_flag in the PPS and the second exemplary syntax design in FIGS. 6A-C illustrates information sharing according to a flag sps_use_more_pps_info_flag in the sequence level, information sharing may also be achieved by signaling in the slice header. The third exemplary syntax design enables information sharing in the PPS according to a slice level flag. The third exemplary syntax design incorporating an embodiment according to the present invention uses a slice level flag is shown in FIGS. 7A-B. The third exemplary syntax design is mostly the same as the first exemplary syntax design shown in FIG. 5A through FIG. 5G except for the PPS and slice header. The information sharing flag sh_use_more_pps_info_flag in the slice header is used to indicate whether to share information for the associated slice. The syntax for PPS can be the same as a conventional PPS in the HM-2.0 as shown in FIG. 7A. The PPS includes PPS ID, pic_parameter_set_id and SPS ID, seq_parameter_set_id. The syntax elements pps_info( ) and pps_alf_param( ) are always incorporated in the PPS. FIG. 7B illustrates exemplary slice header syntax, where the slice header includes PPS ID, pic_parameter_set_id and sh_use_more_pps_info_flag. When sh_use_more_pps_info_flag has a value equal to 0, it denotes no information sharing and accordingly the current slice has its own slice_info( ) and slice_alf_param( ) in the slice header. Otherwise, the current slice does not have its own slice_info( ) and slice_alf_param( ) in the slice header and, instead it uses pps_info( ) and pps_alf_param( ) in the PPS. The first, second and third exemplary syntax designs shown in FIGS. 5A-G, FIGS. 6A-C and FIGS. 7A-B are for illustration purpose to demonstrate syntax design to enable information sharing according to embodiment of the present invention. The specific syntax elements illustrated shall not be construed as limitations to the present invention. A skilled person in the field may practice the present invention using other syntax designs.

While the first, second and third exemplary syntax designs disclosed above illustrate examples of information sharing indicated by an information sharing flag in the PPS, the SPS or the slice header, more than one information sharing flags in different levels may be used. The fourth exemplary syntax design is shown in FIG. 8 to enable the PPS-based information sharing with further adaptivity according to the information sharing flag in the slice level. The fourth exemplary syntax design is mostly the same as the first syntax design as shown in FIGS. 5A-G except for slice_header( ). The syntax elements having the same design are not repeated in FIG. 8. According to the exemplary slice header syntax slice_header( ) of FIG. 8, if pps_use_more_pps_info_flag has a value equal to 1, sh_use_more_pps_info_flag is used to determined whether to share the information in the picture level or to use its own information in the slice level. If sh_use_more_pps_info_flag has a value equal to 1, it indicates information sharing and the slice will use information in the PPS. Accordingly slice_info( ) and slice_alf_param( ) will not be incorporated in the slice header. If sh_use_more_pps_info_flag has a value equal to 0, it indicates no information sharing and the slice will use its own information in the slice header. Accordingly slice_info( ) and slice_alf_param( ) will be incorporated in the slice header. If pps_use_more_pps_info_flag has a value equal to 0, it indicates no information sharing and accordingly the slice uses its own slice_info( ) and slice_alf_param( ) in the slice header. Therefore, a combination of picture level flag pps_use_more_pps_info_flag and the slice level flag sh_use_more_pps_info_flag is used to enable information sharing in the fourth example.

While the fourth exemplary syntax design illustrates an example of using a combination of picture level flag pps_use_more_pps_info_flag and the slice level flag sh_use_more_pps_info_flag to enable information sharing, it is also possible to use other combinations. The fifth exemplary syntax design incorporating an embodiment according to the present invention is shown in FIG. 9, where a combination of the sequence level flag sps_use_more_pps_info_flag and the slice level flag sh_use_more_pps_info_flag is used to enable information sharing. The fifth exemplary syntax design is mostly the same as the second syntax design associated with FIGS. 6A-C except for slice_header( ). The syntax elements having the same design are not repeated in FIG. 9. According to the exemplary slice header syntax, if sps_use_more_pps_info_flag has a value equal to 1, it allows information sharing. In this case, whether to share the information in the picture level or use the individual information in the slice header is determined according to the slice level information sharing flag sh_use_more_pps_info_flag. If sh_use_more_pps_info_flag has a value equal to 1, it indicates information sharing and the slice will use information in the PPS. Accordingly slice_info( ) and slice_alf_param( ) will not be incorporated in the slice header. If sh_use_more_pps_info_flag has a value equal to 0, it indicates no information sharing and the slice will use its own information in the slice header. Accordingly slice_info( ) and slice_alf_param( ) will be incorporated in the slice header. If sps_use_more_pps_info_flag has a value equal to 0, it indicates no information sharing and accordingly the slice uses its own slice_info( ) and slice_alf_param( ) in the slice header. Therefore, a combination of sequence level flag sps_use_more_pps_info_flag and the slice level flag sh_use_more_pps_info_flag is used to enable information sharing in the fifth example.

The sixth exemplary syntax design illustrates yet another example of using a combination of two information sharing flags in two different levels, where the information sharing flags are incorporated in the sequence level and the picture level as shown in FIGS. 10A-B. The sixth exemplary syntax design is mostly the same as that of the second exemplary syntax design except for the PPS and slice_header( ) syntax. The design for these syntax elements that is the same is not repeated syntax. If the SPS flag sps_use_more_pps_info_flag defined in the SPS has a value equal to 1, then information sharing is allowed and whether to share the picture information is determined according to pps_use_more_pps_info_flag. In this case, if the picture level flag pps_use_more_pps_info_flag has a value equal to 1, it indicates information sharing and pps_info( ) and pps_alf_param( ) are incorporated in the PPS as shown in FIG. 10A. If the picture level flag pps_use_more_pps_info_flag has a value equal to 0, it indicates no information sharing and pps_info( ) and pps_alf_param( ) are not incorporated in the PPS as shown in FIG. 10A. Instead, slice_info( ) and slice_alf_param( ) are incorporated in the slice header. If sps_use_more_pps_info_flag has a value equal to 0, it indicates no information sharing is allowed. Accordingly pps_info( ) and pps_alf_param( ) are not incorporated in the PPS and instead, slice_info( ) and slice_alf_param( ) are incorporated in the slice header. Therefore, the sixth syntax design example illustrates a case of information sharing based on the SPS flag sps_use_more_pps_info_flag and the picture flag pps_use_more_pps_info_flag.

While a combination of two flags are used in the fourth, fifth and sixth examples for indicating information sharing, it is also possible to use the combination of three flags in all three levels to indicate information sharing. In the seventh example, the SPS flag sps_use_more_pps_info_flag, the PPS flag pps_use_more_pps_info_flag, and the slice header flag sh_use_more_pps_info_flag are used jointly to indicate information sharing. The seventh exemplary syntax design is mostly the same as that for the sixth example except for the slice_header( ). The seventh syntax design for slice_header( ) is shown in FIG. 11, where the design for these syntax elements that are the same as these of the sixth example are not repeated. When sps_use_more_pps_info_flag has a value equal to 0, information sharing will not be allowed. When sps_use_more_pps_info_flag has a value equal to 1 and pps_use_more_pps_info_flag has a value equal to 0, information sharing will not be allowed either. In these two case, pps_info( ) and pps_alf_param( ) are not incorporated in the PPS. Instead, slice_info( ) and slice_alf_param( ) are incorporated in the slice header so that each slice can use its own information. When sps_use_more_pps_info_flag has a value equal to 1 and pps_use_more_pps_info_flag has a value equal to 1, information sharing is allowed. In this case, pps_info( ) and pps_alf_param( ) are incorporated in the PPS and it is up to sh_use_more_pps_info_flag regarding whether to share the information in the picture level or use the information in the slice level. If sh_use_more_pps_info_flag has a value 1, it indicates information sharing in the PPS and slice_info( ) and slice_alf_param( ) will not be incorporated in the slice header. If sh_use_more_pps_info_flag has a value equal to 0, it indicates no information sharing and accordingly slice_info( ) and slice_alf_param( ) are incorporated in the slice header so that the slice can use individual information. Therefore, the seventh syntax design example illustrates a case of information sharing based on the SPS flag sps_use_more_pps_info_flag, the picture flag pps_use_more_pps_info_flag and the slice level flag sh_use_more_pps_info_flag.

To further illustrate information sharing incorporating embodiments according to the present invention, several detailed examples are described as follows. In one example, the first picture is partitioned into 9 slices, the second picture contains only one slice, and the third picture also contains one slice. In other words, there is no slice partition in the second and third pictures. At the encoder end, the pic_parameter_set_id for the first picture is set to 0 and the picture parameters set (PPS) for the first picture is designated as PPS 0. The pps_use_more_pps_info_flag in PPS 0 is set to 1 to allow information sharing. All 9 slice headers in the first picture refer to the PPS 0 and the slice common information of the 9 slices is incorporated in PPS 0. The pic_parameter_set_id for the second picture is set to 1 and the picture parameters set (PPS) for the second picture is designated as PPS 1. Since there is only one slice in the second picture and there is no need for information sharing. Accordingly, pps_use_more_pps_info_flag in PPS 1 is set to 0 and the slice header refers to the PPS 1. Similarly, the only slice in the third picture may also refer to the PPS 1 to disable information sharing.

The operations at the decoder side corresponding to the above example are described as follows. The PPS 0 is received and information sharing is enabled according to pps_use_more_pps_info_flag in PPS 0. Accordingly, shared information such as ALF coefficients related parameters and non-ALF common information are used for all 9 slices in the first picture. Furthermore, the decoder receives further information such as ALF CU ON/OFF control related parameters in each of the 9 slice headers in the first picture. ALF is then applied to each slice according to ALF coefficients related parameters in PPS 0 and the ALF CU ON/OFF control related parameters in respective slice header. The decoder then proceeds to receive PPS 1. According to pps_use_more_pps_info_flag in PPS 1 which has a value equal to 0 in this example to indicate no information sharing, the decoder receives ALF information such as ALF coefficients related parameters and ON/OFF control related parameters from the slice header. ALF is then applied to the only slice in the second picture. The decoder further proceeds to receive the slice header in the third picture. Since the slice header for the slice of the third picture also refers to PPS 1, the decoder receives ALF information such as ALF coefficients related parameters and ON/OFF control related parameters from the slice header of the slice of the third picture. ALF is then applied to the only slice in the third picture.

The following example illustrates time-delayed ALF filtering using picture-layer parameter set incorporating an embodiment according to the present invention. This example also illustrates that the present invention can provide both picture-level and slice-level adaptation of ALF parameters. In this example, the first picture is partitioned into 9 slices, the second picture contains one slice, and the third picture also contains one slice. In other words, there is no slice partition in the second and third pictures. In the first picture, the first 5 slices use an ALF derived based on the 5 slices and the remaining 4 slices share the same ALF coefficients as the first 5 slices to perform time-delayed filtering. Similarly, the third picture uses the ALF coefficients derived from the second picture to perform time-delayed filtering. At the encoder side, the ALF coefficients are derived based on the first 5 slices of the first picture and the ALF coefficients are incorporated in PPS 0. Since the ALF coefficients are based on the first 5 slices, the encoder has to wait for the completion of encoding first 5 slices and then determines the ALF coefficients. Therefore, the ALF filtering for the first 5 slices is delayed until all 5 slices are encoded. All 9 slice headers in the first picture refer to the PPS 0. In the second picture, the ALF coefficients derived for the second picture are incorporated in PPS 1 and the slice header associated with the second picture refers to PPS 1. For the third picture, the slice uses the ALF coefficients designed based on the second picture and the slice header also refers to PPS 1. At the decoder side, the operations are similar to the above example of filtering without time delay.

Besides ALF, offset restoration such as edge offset or band offset may also share information in the picture level and slice level. For offset correction, the offset information associate with the slice can be incorporated in the bitstream so that a decoder may apply a proper offset value to correct offset for the slice. The following example illustrates time-delayed offset restoration using picture-layer parameter set incorporating an embodiment according to the present invention. In this example, the first picture is partitioned into 9 slices, the second picture has 1 slice, and the third picture also has 1 slice. In other words, there is no slice partition in the second and third pictures. In the first picture, the first 5 slices use the offset information based on the 5 slices and the remaining 4 slices share the same offset information as the first 5 slices to perform time-delayed offset restoration. Similarly, the third picture uses the offset information derived from the second picture to perform time-delayed offset restoration. At the encoder side, the offset information is derived based on the first 5 slices of the first picture and the offset information is incorporated in PPS 0. All 9 slice headers in the first picture refer to the PPS 0. In the second picture, the offset information derived for the second picture is incorporated in PPS 1 and the slice header associated with the second picture refers to PPS 1. In the third picture, the slice header also refers to PPS 1. Information sharing associated with offset restoration can be incorporated in the non-ALF common information.

At the decoder side, the PPS 0 is received. According to pps_use_more_pps_info_flag in PPS 0 which has a value 1 in this example to indicate information sharing, the decoder uses offset information in PPS 0 for all slices in the picture. Information sharing associated with offset restoration may be incorporated in the non-ALF common information. The 9 slice headers in the first picture are received. The slice headers refer to PPS 0 and the offset information in PPS 0 are used for the first picture. The decoder then proceeds to receive the PPS 1 and receives the slice header in the second picture. The slice header refers to PPS 1 and the offset information in PPS 1 is used for the second picture. The decoder proceeds further to receive the slice header associated with the third picture. The slice header refers to PPS 1 and the offset information in PPS 1 is used for the third picture.

Figure 12:
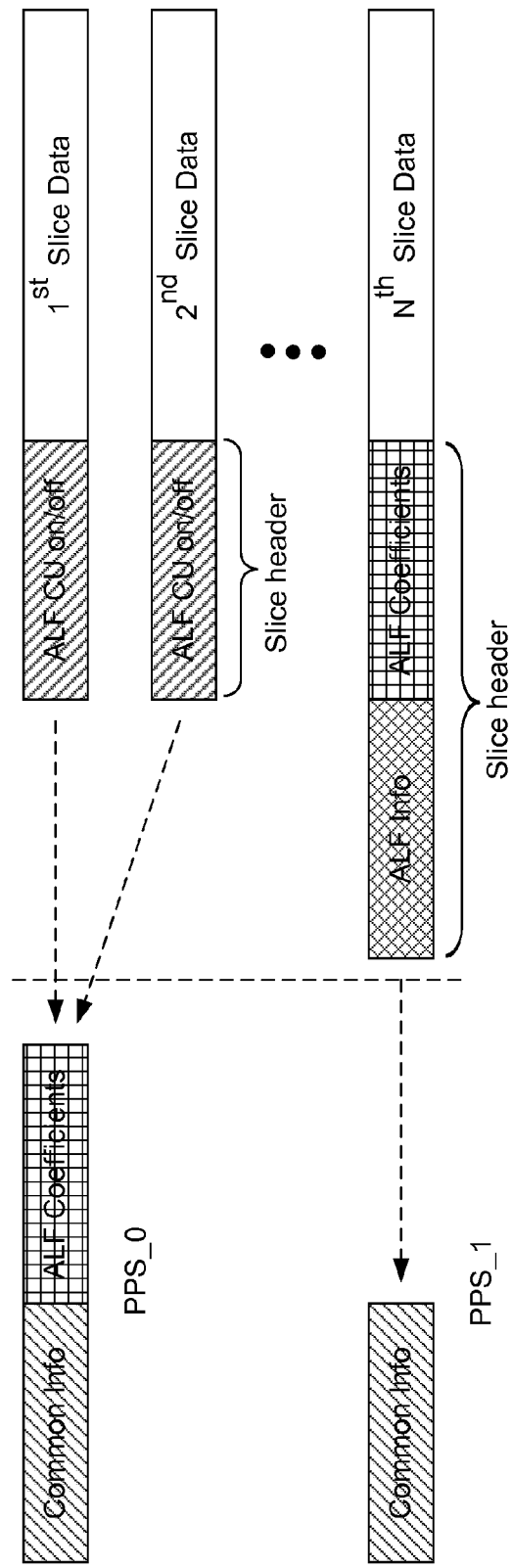
FIG. 12 illustrates an example of syntax structure of PPS and slice header according to an embodiment of the present invention, where multiple PPS syntax elements are used for multiple slices of a picture.

The exemplary syntax design illustrated above also enables a picture with multiple slices to use more than one picture-layer parameter set. FIG. 12 illustrates an example of syntax structure incorporating an embodiment according to the present invention. The picture is divided into N slices and slice 1 through (N−1) share the same ALF coefficients incorporated in PPS_0. Slice N refers to a different PPS, i.e., PPS_1, where information sharing is disabled. Accordingly, slice N uses its own information in the slice header. While two picture headers are used, more than two picture headers may also be used. While the slices are partitioned to have the last slice referring to the second picture header in FIG. 12, slices may also be partitioned differently to practice an embodiment according to the present invention.

Figure 13:
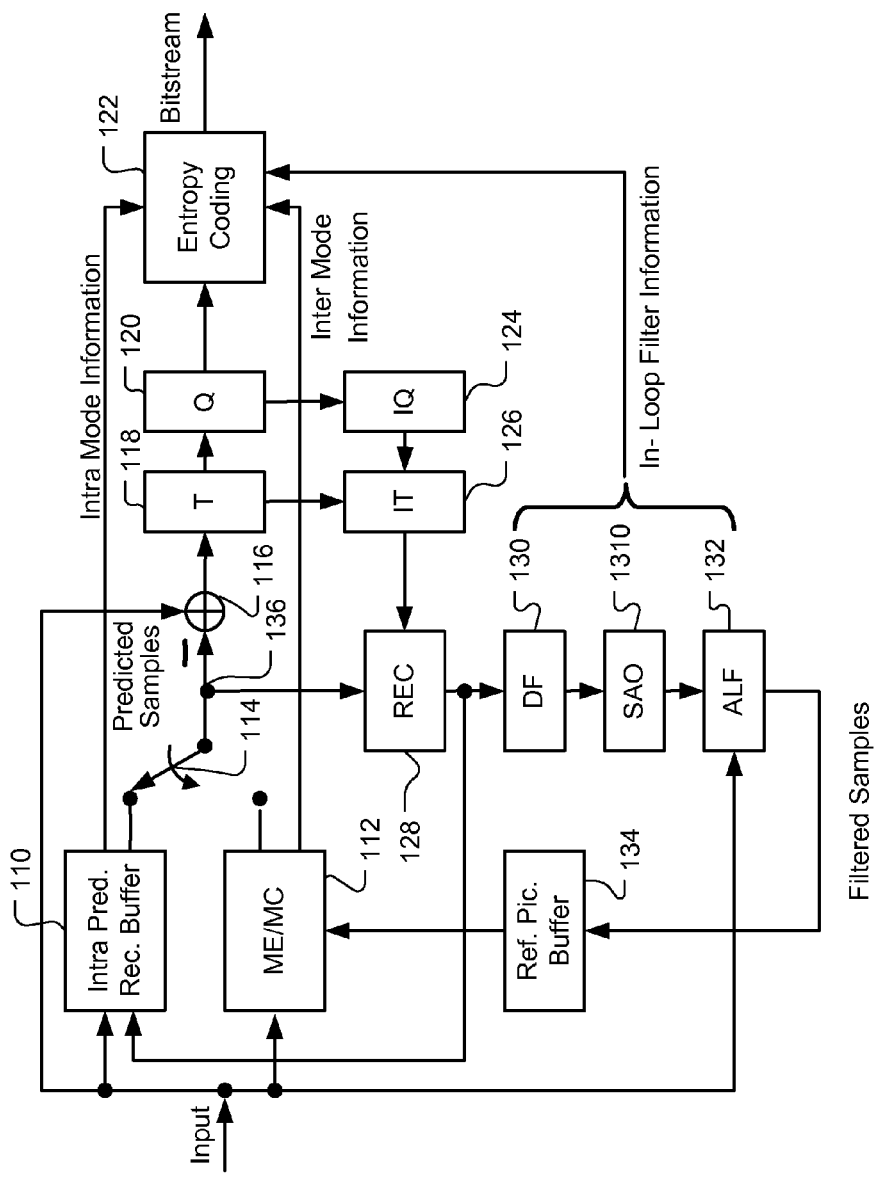
FIG. 13 illustrates an exemplary encoder incorporating sample adaptive offset (SAO) filter between de-block filter (DF) and adaptive loop filter (ALF).
Figure 14:
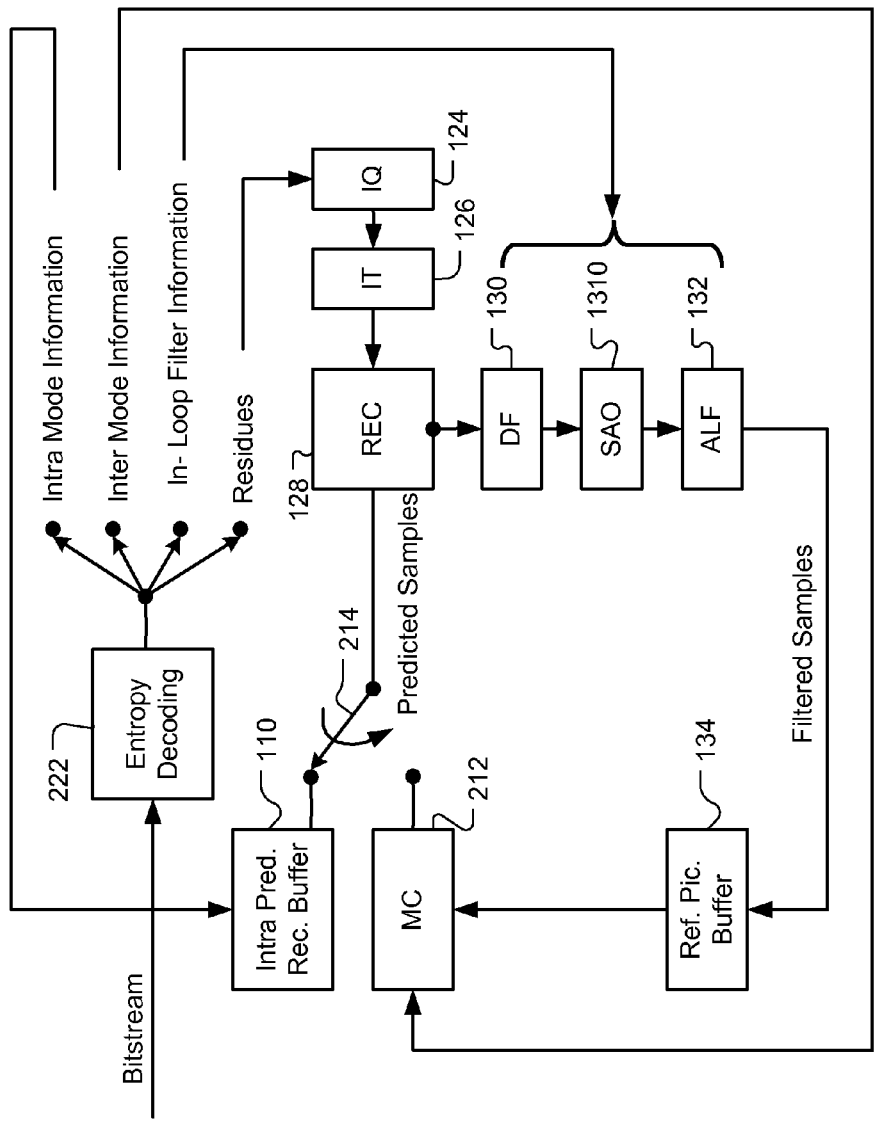
FIG. 14 illustrates an exemplary decoder incorporating sample adaptive offset (SAO) filter between de-block filter (DF) and adaptive loop filter (ALF).

While FIG. 1 and FIG. 2 illustrate de-blocking filter and adaptive loop filter as two types of in-loop filters used in the coding system, other types of in-loop filters may also be used to process reconstructed video data. For example, an in-loop filter named sample adaptive offset (SAO) was disclosed in U.S. patent application Ser. No. 13/177,424, filed Jul. 6, 2011. When SAO is used as an in-loop filter, it can be applied to the reconstructed signal before de-blocking, between de-blocking and ALF, or after ALF. FIG. 13 illustrates an example of applying SAO 1310 between de-blocking filter (DF) 130 and ALF 132. In order to allow a decoder to properly apply corresponding in-loop filters to the reconstructed video data, information related to in-loop filter parameters have to be made known to the video decoder. For example, the information related to in-loop filter parameters can be carried in the video bitstream. FIG. 13 illustrates an example that the in-loop filter information associated with de-blocking, SAO and ALF are provided to entropy coding 122 for incorporation in the video bitstream. Video encoding block 122 may incorporate filter information related to DF, SAO and ALF in the video bitstream in a compressed form. While the in-loop filter information may be incorporated in the video bitstream in a compressed form, some or all of the in-loop filter information may also be incorporated in an uncompressed form. FIG. 14 illustrates an exemplary decoder having de-blocking, SAO and ALF as in-loop filters. Again, SAO is used between de-blocking and ALF to match the arrangement of the encoder in FIG. 13. The in-loop filter information is extracted by entropy decoder 222 and is provided to respective in-loop filters, such as de-blocking, SAO and ALF.

Figure 15A:
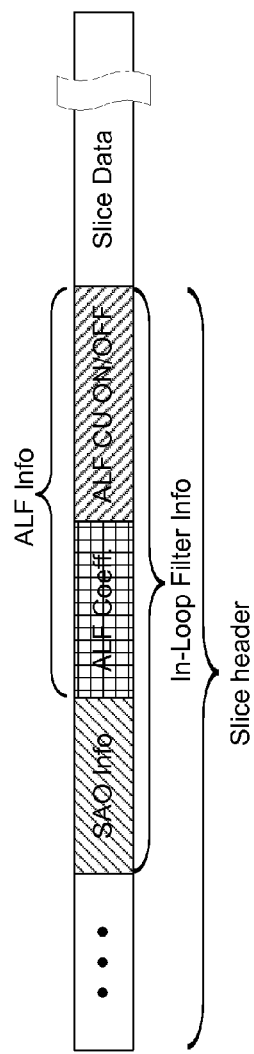
FIG. 15A illustrates slice data structure comprising in-loop filter information consisting of SAO information and ALF information in the slice header for a one-slice picture.
Figure 15B:
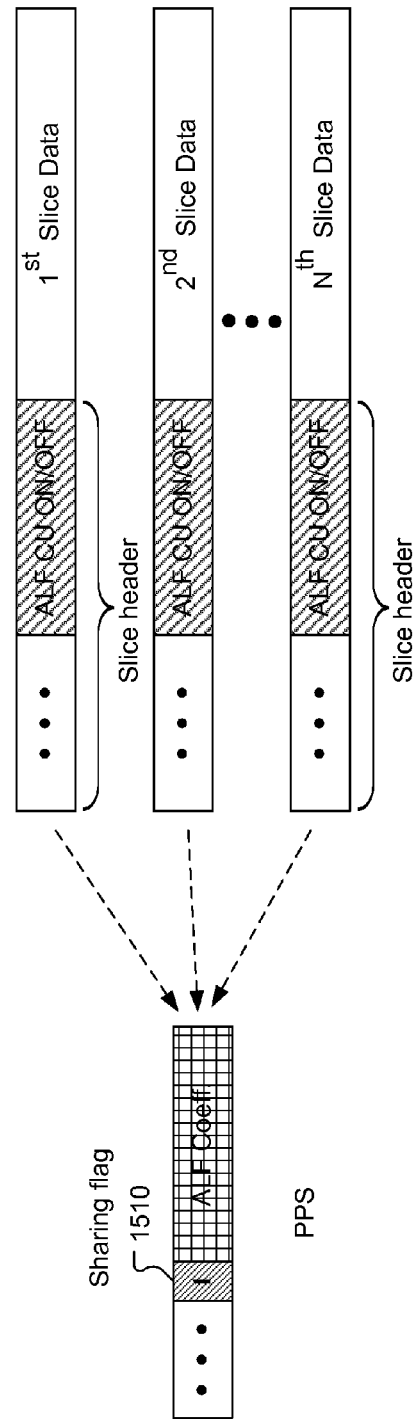
FIG. 15B illustrates data structure of slice header and PPS for in-loop filter information sharing for a multiple-slice picture.

In the HEVC Test Model Version 3.2 (HM-3.2), the in-loop filter information is incorporated in the slice header. For a picture consists of one slice, the slice data structure is shown in FIG. 15A, where the slice header comprises in-loop filter information consisting of SAO information and ALF information. Furthermore, the ALF information consists of ALF coefficients related parameters and ALF CU ON/OF control information. For a picture consists of multiple slices, some in-loop filter information may be shared. For example, according to HM-3.2, the ALF information may be shared as shown in FIG. 15B. The ALF coefficients are incorporated in the PPS for associated slices to share. On the other hand, ALF CU ON/OFF control information is incorporated in the slice header of individual slices as shown in FIG. 15B. While the method illustrated in FIG. 15B demonstrates a means for in-loop filter information sharing, redundant information in the PPS will have to be sent for every picture. On the other hand, the original intention of PPS design is not meant for frequently changing information. Accordingly a new parameter set, named Adaptation Parameter Set (APS), is developed to overcome the issue of sending redundant information in every picture and the issue of lack of support for frequently changing information. The APS according to the present invention will only contain information related to in-loop filters so that it will allow for frequently changing information without the burden of repeating information that does not change frequent. The information carried by APS may include partial or complete filter parameters. Furthermore, APS may also include one identifier to indicate the APS selected if multiple APSs is used. The APS can be incorporated in the video bitstream using a raw byte sequence payload (RBSP) format.

Adaptation Parameter Set (APS) according to one embodiment of the present invention allows activation once per picture. When APS is activated, it is only activated in the first received slice of one picture. The APS may stay the same from picture to picture and may also change between pictures. Furthermore, the APS only contains information that is expected to change frequently between pictures. One exemplary data structure incorporating APS according to one embodiment of the present invention is shown in FIG. 16A for a one-slice picture. The SAO information and ALF coefficients are incorporated in the APS instead of the PPS. The slice data structure is similar to the slice data structure shown in FIG. 15B for a multiple-slice picture in HM-3.2. FIG. 16B illustrates exemplary data structure incorporating APS according to one embodiment of the present invention for a multiple-slice picture. There is no in-loop information sharing flag in the PPS. The data structure used for the multiple-slice picture is the same as that for a single-slice picture except that there are multiple slice data for the multiple-slice picture. The APS example shown in FIGS. 16A-B illustrates the case that SAO and ALF always share in-loop filter information in the same APS. However, as to be discussed later, it is also possible to use separate APSs for SAO and ALF. As shown in FIGS. 16A-B, ALF CU ON/OFF control related parameters always stay in slice header either in one-slice or in multiple-slice picture case.

FIG. 17 illustrates an example of slice syntax design to support APS according to one embodiment of the present invention. If either SAO or ALF is enabled as indicated in SPS by sample_adaptive_offset_enabled_flag or adaptive_loop_filter_enabled_flag respectively, APS identifier, aps_id is incorporated so that the slice will be able to share the in-loop filter information carried in the APS as indicated by aps_id. Furthermore, if ALF is enabled as indicated by adaptive_loop_filter_enabled_flag and some ALF information is shared in APS as indicated by aps_adaptive_loop_filter_enabled_flag, only ALF CU ON/OF control information will be incorporated in the slice header. The slice header design example in FIG. 17 uses a single aps_id for all in-loop filters to share information. Nevertheless, other slice header design may also be used to practice the present invention. For example, instead of joint APS for all in-loop filters, individual APS may be used for each of the in-loop filters. Alternatively, one portion of in-loop filters may have individual APS and other portion may share joint APS.

Figure 18:
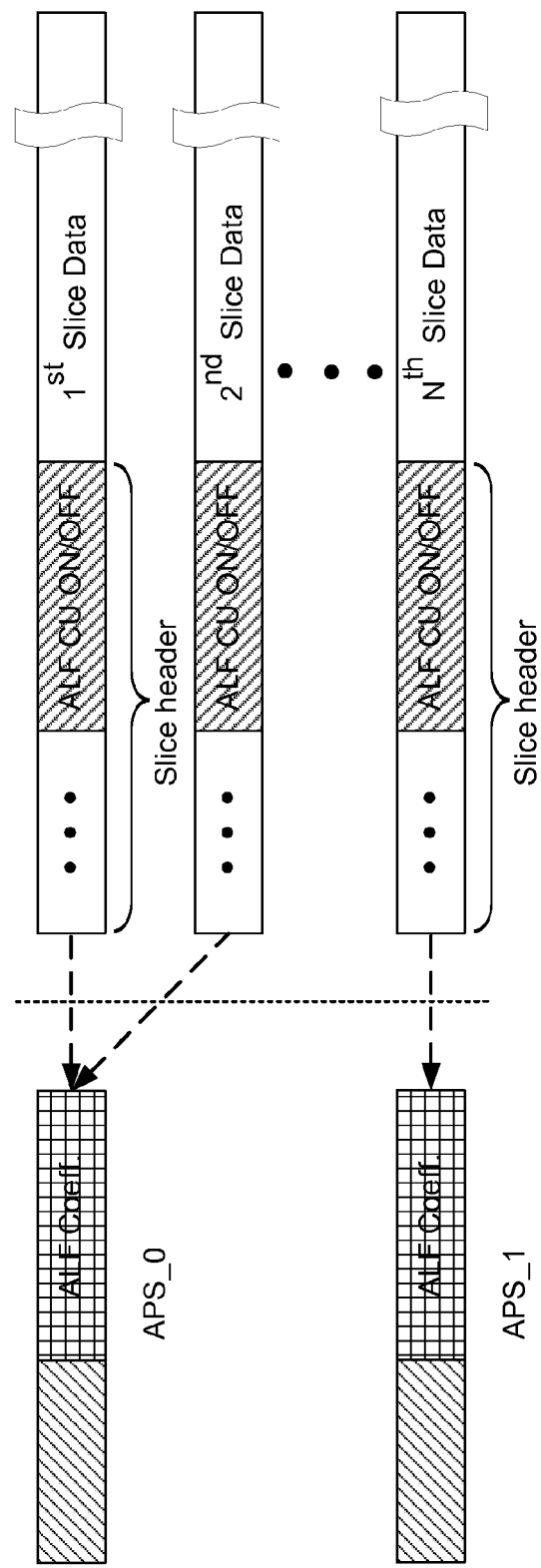
FIG. 18 illustrates an example of multiple APSs in a picture where each slice can select in-loop filter information from multiple APSs.

The slice header design shown in FIG. 17 allows each slice to select its own aps_id to determine the in-loop filter information for the slice. Therefore, the exemplary slice header design in FIG. 17 is capable of accommodating slices in a picture to use different APSs. FIG. 18 illustrates an example of two APSs in a picture to carry two sets of ALF coefficients. Depending on the aps_id in the respective slice header, the slice may either choose to use the in-loop filter information carried in APS_0 or APS_1. The example in FIG. 18 illustrates the scenario that the first and the second slices use in-loop filter information in APS_0 while the N-th slice uses in-loop filter information in APS_1. While two APSs in a picture are illustrated in FIG. 18, more APSs may be used in a picture. APS identifier, aps_id has to be designed accordingly to be able to represent the number of APSs allowed in the picture.

Figure 19A:
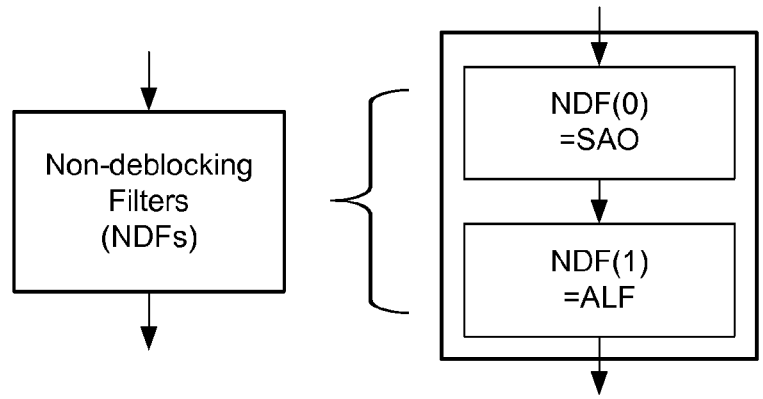
FIG. 19A illustrates an example of NDFs, where NDFs consist of two sequential in-loop filters with NDF(0)=SAO and NDF(1)=ALF.
Figure 19B:
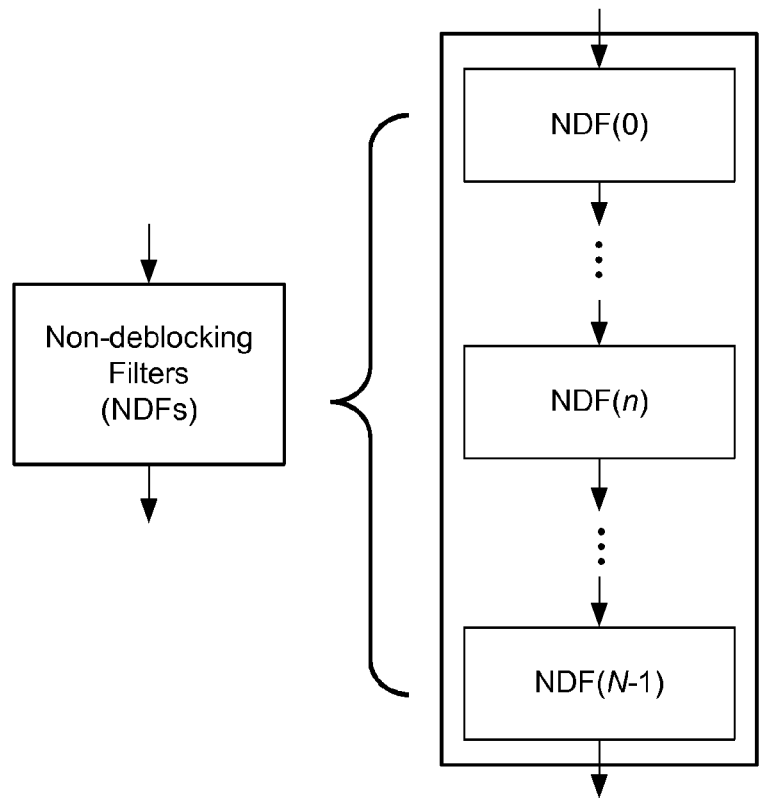
FIG. 19B illustrates an example of NDFs, where NDFs consist of N in-loop filters, NDF(0), . . . , NDF(N−1).

Among various in-loop filters, the de-blocking filter is applied to block boundaries such as boundaries of transform unit. Usually the required filter information is determined from a block to be de-blocked and no filter information sharing is required. Therefore, in-loop filter information sharing can be applied to in-loop filters other than de-blocking filter. The in-loop filters other than de-blocking filter are termed as non-deblocking filters (NDFs) in this disclosure. In one embodiment according to the present invention, the NDFs includes SAO and ALF as shown in FIG. 19A, where NDFs consist of two in-loop filters with NDF(0)=SAO and NDF(1)=ALF. If the ALF is applied before SAO, the NDFs can be represented as NDF(0)=ALF and NDF(1)=SAO. The NDFs can be extended to include N in-loop filters as shown in FIG. 19B, where NDFs consist of NDF(0), ..., NDF(N-1). According to an embodiment of the present invention, parameters of NDFs are coded and signaled in the APS. The APS is a picture-level (or picture-layer) raw byte sequence payload (RBSP) that contains frequently changed picture-level information. Also, the existence of APS depends on the usage flags of NDFs signaled in a sequence parameter set (SPS). No APS will be signaled if the usage flags of NDFs in the SPS indicate that all NDFs are turned off, i.e., all usage flags are zero.

Figure 20:
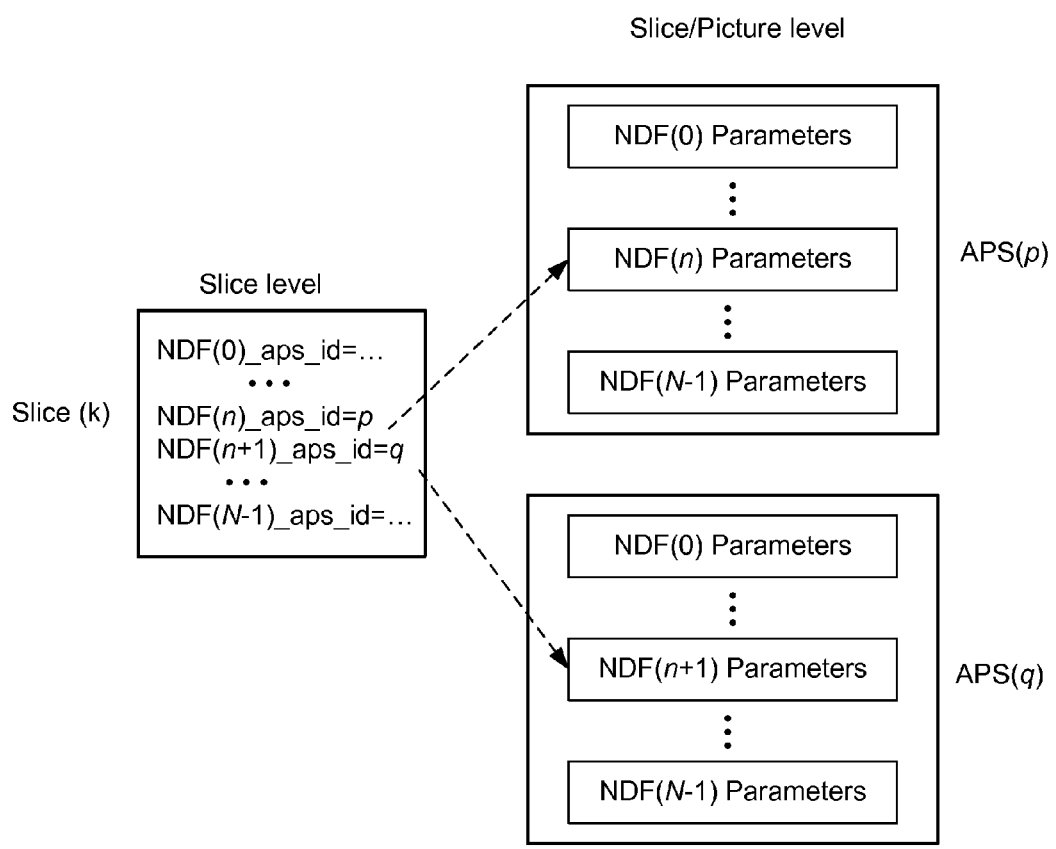
FIG. 20 illustrates an exemplary data structure design to allow each in-loop filter in a slice to use its own APS identifier.

The exemplary slice header syntax shown in FIG. 17 uses one aps_id in the slice header for all in-loop filters. However, each in-loop filter for a slice may have its own aps_id to increase flexibility. For example, multiple APS IDs can be signaled in a slice header and the slice can select a different APS for each NDF. The existence of NDF(n) APS identifier, NDF(n)_aps_id for NDF(n) in the slice header is implicitly decided by the usage flag of NDF(n) in an SPS. If the usage flag of NDF(n) in the SPS is 0, NDF(n)_aps_id is not incorporated in the slice header. FIG. 20 illustrates an exemplary data structure design to allow each in-loop filter in a slice to use its own APS identifier, aps_id. In the slice level, the slice header for slice k comprises APS identifiers for all in-loop filters, i.e., NDF(0)_aps_id, NDF(1)_aps_id, ..., and NDF(N-1)_aps_id. On the other hand, the multiple APSs are carried in the picture/slice level. The APS identifier for NDF (i), NDF(i)_aps_id may point to an APS different from that for other NDF(j). In the example of FIG. 20, NDF(n)_aps_id=p and NDF(n+1)_aps_id=q imply that filter information for filter NDF(n) is selected from APS(p) and filter information for filter NDF(n+1) is selected from APS(q). For example, in the case of two NDFs with NDF(0)=SAO and NDF(1)=ALF, if the APS ID for ALF, ALF_aps_id is 0, the ALF parameters in APS(0) will be applied for the ALF process of the slice. If the APS ID for SAO, SAO_aps_id is 2, the SAO parameters in APS(2) will be applied for the SAO process of the slice. Both ALF_aps_id and SAO_aps_id are signaled in the slice header. FIG. 21 and FIG. 22 illustrate slice header and APS syntax examples to support multiple in-loop filters and to allow each in-loop filter having its own filter information selected from a set of APSs. FIG. 21 illustrates an exemplary slice header syntax that allows the slice to select separate filter information for SAO and ALF from multiple APSs. For example, when SAO Enable Flag, sample_adaptive_offset_enabled_flag in SPS indicates SAO is enabled, SAO_aps_id is incorporated to allow the slice to select SAO filter information from the APS pointed by SAO_aps_id. Similarly, when adaptive_loop_filter_enabled_flag in SPS indicates ALF is enabled, ALF_aps_id is incorporated to allow the slice to select ALF filter information from the APS pointed by ALF_aps_id. In the APS syntax, i.e., aps_parameter_set_rbsp( ), an APS identifier, aps_parameter_set_id is included as shown in FIG. 22. The respective SAO information, SAO_param( ) and ALF information, ALF_param( ) are also included in aps_parameter_set_rbsp( ).

Figure 23:
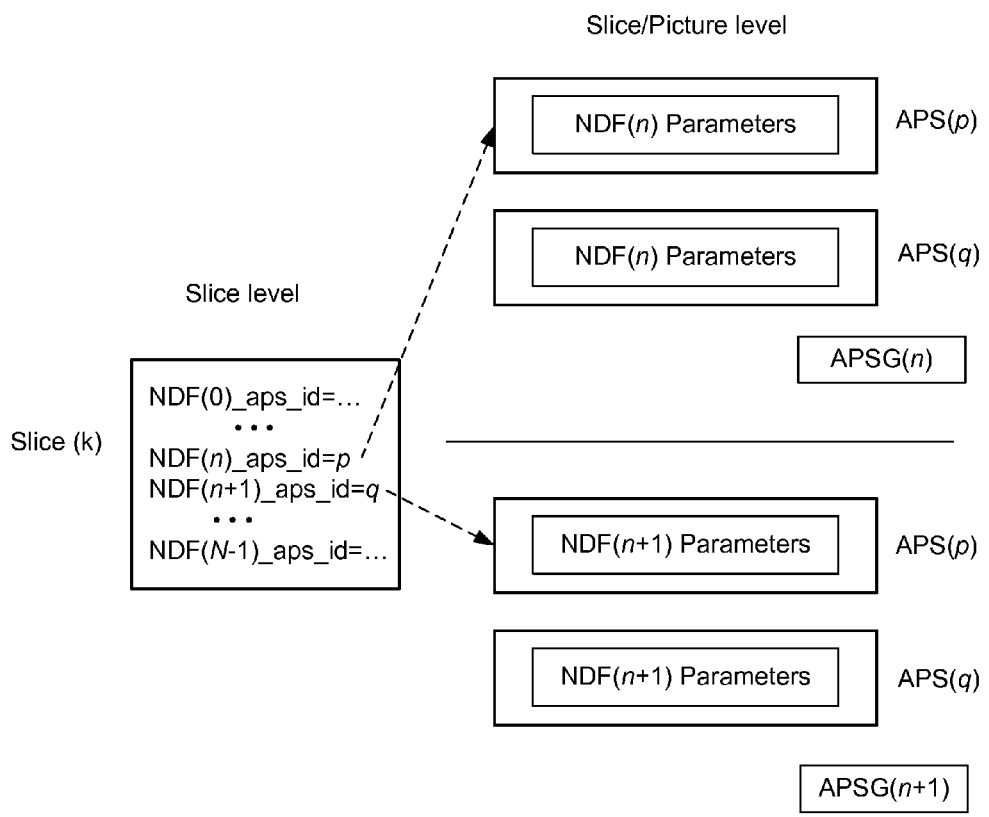
FIG. 23 illustrates an exemplary data structure design to allow each in-loop filter in a slice to use its own APS identifier to select filter information from multiple APSs organized into APS groups.

In another embodiment of the present invention, multiple APSs for the same NDF tool can be collected in an APS group (APSG). As mentioned before, NDF(n) refers to a particular in-loop filter type or in-loop filter tool among NNDFs. For example, NDF(0) in FIG. 19A refers to SAO in-loop filter. Accordingly, NDF(n) is also referred to as nth NDF tool. When APS group is used, APSG(n) is used to designate the APS group for NDF(n) parameters. The existence of APSG (n) can be implicitly determined according to the usage flag of NDF(n) in the SPS. If the usage flag of NDF(n) in the SPS indicates that NDF(n) is not used, APSG(n) will not be signaled. The existence of NDF(n)_aps_id in the slice header is implicitly determined according to the usage flag of NDF(n) in the SPS. If the usage flag of NDF(n) in the SPS indicates that NDF(n) is not used, NDF(n)_aps_id is not signaled in the slice header. Exemplary slice header and APS structure to enable the flexible filter information sharing is illustrated in FIG. 23, where the slice header structure remains the same and the APSs for a particular NDF tool is organized into a group. For example, sets of parameters for NDF(n) can be organized in the group APSG(n). Similarly, sets of parameters for NDF(n+1) can be organized in the group APSG(n+1). If NDF(n)_aps_id equals to p, parameters APS(p) in APSG(n) is selected. Similarly, if NDF(n+1)_aps_id equals to q, parameters APS(q) in APSG(n+1) is selected.

The slice header structure in FIG. 23 is the same as the in FIG. 20. Therefore, the same slice header syntax shown in FIG. 21 can be used to support the case using APS group. The syntaxes for APS in the SAO APSG and ALF APSG are shown in FIG. 24 and FIG. 25 respectively. In FIG. 24, the APS syntax, aps_sao_parameter_set_rbsp( ) in the SAO APSG, includes an APS ID, aps_sao_parameter_set_id for the SAO parameters in the SAO APSG and SAO_param( ) associated with aps_sao_parameter_set_id. Similarly, in FIG. 25, the APS syntax, aps_alf_parameter_set_rbsp( ) in the ALF APSG, includes an APS ID, aps_alf_parameter_set_id for the ALF parameters in the ALF APSG and ALF_param( ) associated with aps_alf_parameter_set_id.

According to another embodiment of the present invention, a flag multiple_aps_ids_enabled_flag in the SPS can be used to indicate if multiple APS IDs or single APS ID is signaled in the slice header. When this flag in the SPS indicates that multiple APS IDs are used, then multiple APS IDs are signaled in the slice header to select filter information for in-loop filters from the multiple APSs. When this flag in SPS indicates that single APS ID is used, only one APS ID is signaled in slice header, which is similar to the case in FIG. 17. FIG. 26 illustrates an exemplary SPS syntax including the multiple APS IDs flag, multiple_aps_ids_enabled_flag. FIG. 27 illustrates an exemplary slice header syntax to support the above multiple APS IDs. When the multiple APS IDs as indicated by multiple_aps_ids_enabled_flag is enabled, the slice header will contain a SAO APS ID, SAO_aps_id if SAO is enabled as indicated by sample_adaptive_offset_enabled_flag in SPS. Furthermore, the slice header will contain ALF APS ID, ALF_aps_id if ALF is enabled as indicated by adaptive_loop_filter_enabled_flag in SPS. If the multiple APS IDs as indicated by multiple_aps_ids_enabled_flag is not enabled, the slice header will contain a common APS ID, ndf_aps_id if SAO is enabled as indicated by sample_adaptive_offset_enabled_flag in SPS or ALF is enabled as indicated by adaptive_loop_filter_enabled_flag in SPS. The exemplary slice header syntax in FIG. 27 accommodates two types of NDFs, i.e., SAO and ALF. However, an embodiment according to the present invention may include more or less NDFs. Furthermore, the exemplary syntaxes shown above are intended to illustrate examples to practice various embodiment of the present invention. A skilled person in the field may use other syntax to practice the present invention without departing from the spirit of the present invention.

Figure 28:
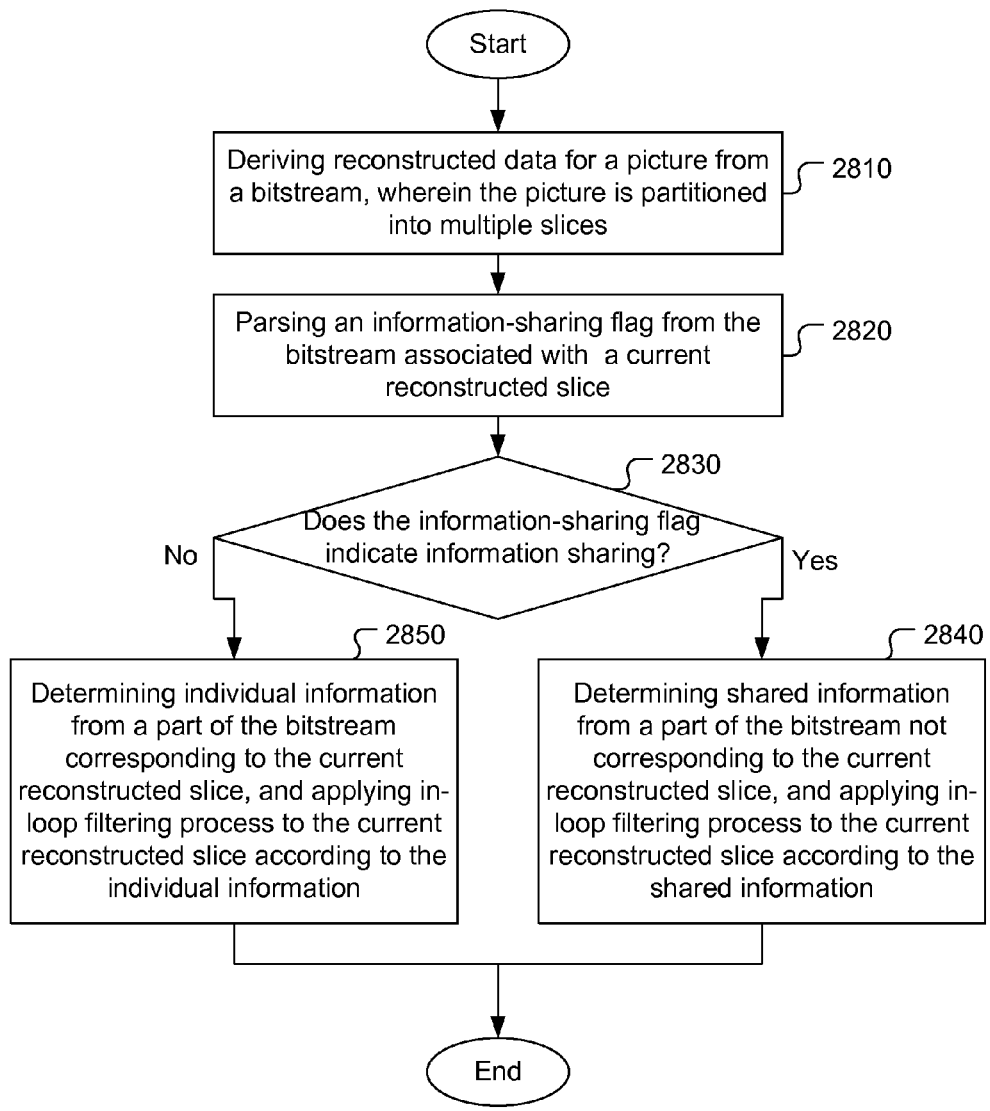
FIG. 28 illustrates an exemplary flowchart of information sharing at a decoder side according to an embodiment of the present invention.

FIG. 28 illustrates an exemplary flowchart of information sharing at a decoder side according to an embodiment of the present invention. The system derives reconstructed data for a picture from a bitstream as shown in step 2810, where the picture is partitioned into multiple slices. An information-sharing flag is parsed from the bitstream associated with a current reconstructed slice as shown in step 2820. The system then checks whether the information-sharing flag indicates information sharing as shown in step 2830. If the test result is "Yes", step 2840 is performed. If the test result is "No", step 2850 is performed. In step 2840, shared information is determined from a part of the bitstream not corresponding to the current reconstructed slice, and in-loop filtering process is applied to the current reconstructed slice according to the shared information. In step 2850, individual information is determined from a part of the bitstream corresponding to the current reconstructed slice, and in-loop filtering process is applied to the current reconstructed slice according to the individual information.

Figure 29:
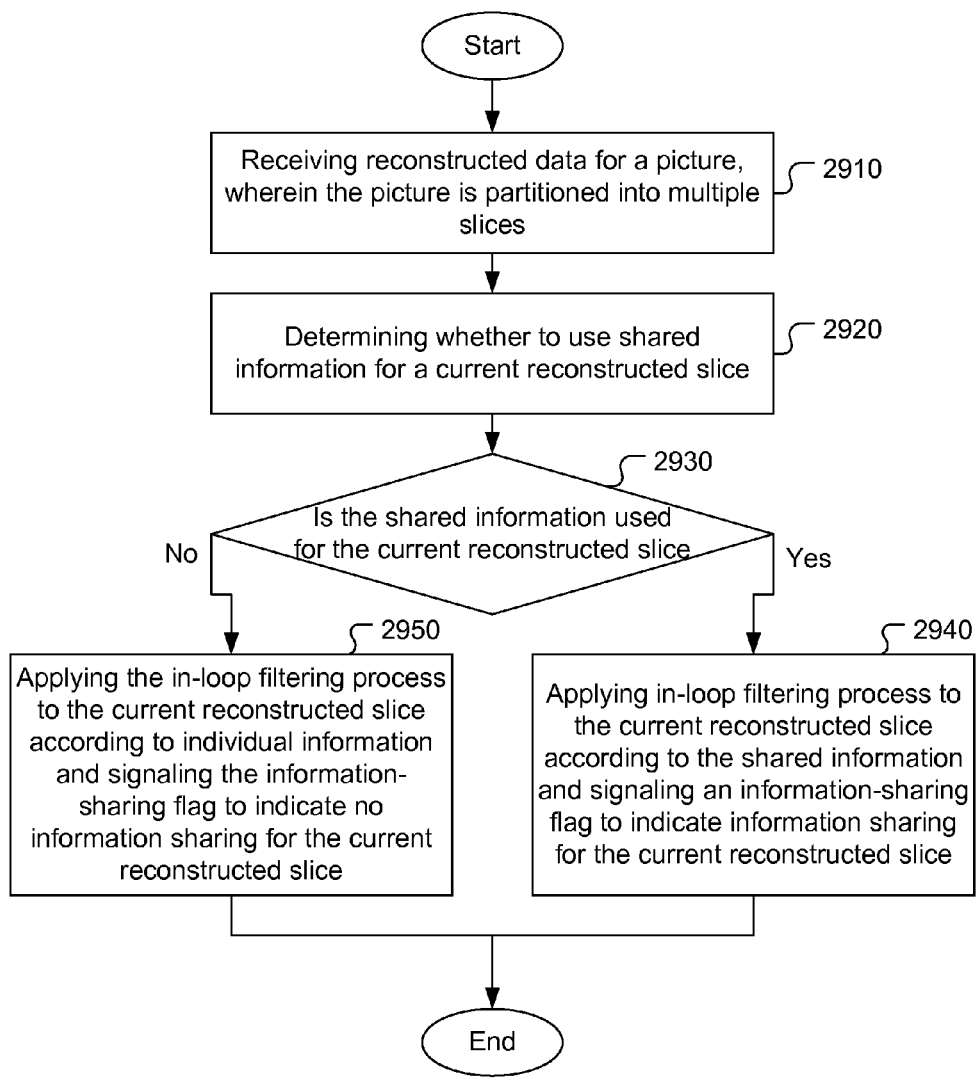
FIG. 29 illustrates an exemplary flowchart of information sharing at an encoder side according to an embodiment of the present invention.

FIG. 29 illustrates an exemplary flowchart of information sharing at an encoder side according to an embodiment of the present invention. The system receives reconstructed data for a picture as shown in step 2910, where the picture is partitioned into multiple slices. An information-sharing flag is determined for a current reconstructed slice as shown in step 2920. The system then checks whether the shared information is used for the current slice as shown in step 2930. If the test result is "Yes", step 2940 is performed. If the test result is "No", step 2950 is performed. In step 2940, in-loop filtering process is applied to the current reconstructed slice according to the shared information and an information-sharing flag is signaled to indicate information sharing for the current reconstructed slice. In step 2950, the in-loop filtering process is applied to the current reconstructed slice according to individual information and the information-sharing flag is signaled to indicate no information sharing for the current reconstructed slice.

The common information sharing scheme described above can be used in a video encoder as well as in a video decoder. Embodiments of common information sharing according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of sharing information in a video decoding system, the method comprising:
    deriving reconstructed data for a picture from a bitstream, wherein the picture is partitioned into multiple segments;
    parsing a filter information-sharing flag from the bitstream associated with a current reconstructed segment;
    if the filter information-sharing flag indicates filter information sharing, determining shared filter information from a part of the bitstream not corresponding to the current reconstructed segment, and applying in-loop filtering process to the current reconstructed segment according to the shared filter information; and
    if the filter information-sharing flag indicates no filter information sharing, determining individual filter information from a part of the bitstream corresponding to the current reconstructed segment, and applying in-loop filtering process to the current reconstructed segment according to the individual filter information.

2. The method of claim 1, wherein the in-loop filtering process corresponds to sample adaptive offset (SAO), adaptive loop filter (ALF), linear spatial filter, deblocking filter or a combination thereof.

3. A method of sharing filter information in a video encoding system, the method comprising:

receiving reconstructed data for a picture, wherein the picture is partitioned into multiple segments;

determining whether to use shared filter information for a current reconstructed segment;

if the shared filter information is used for the current reconstructed segment, applying in-loop filtering process to the current reconstructed slice according to the shared filter information and signaling a filter information-sharing flag to indicate filter information sharing for the current reconstructed segment; and if the shared filter information is not used for the current reconstructed segment, applying the in-loop filtering process to the current reconstructed segment according to individual filter information and signaling the filter information-sharing flag to indicate no filter information sharing for the current reconstructed segment.

4. The method of claim 3, wherein the in-loop filtering process corresponds to sample adaptive offset (SAO), adaptive loop filter (ALF), linear spatial filter, deblocking filter or a combination thereof.

5. The method of claim 1, wherein each of said multiple segments is associated with a slice.

6. The method of claim 1, wherein the filter information-sharing flag is in a header associated with a segment.

7. The method of claim 3, wherein each of said multiple segments is associated with a slice.

8. The method of claim 3, wherein the filter information-sharing flag is in a header associated with a segment.

9. A method of sharing information in a video decoding system, the method comprising:

receiving a first information-sharing flag in picture level data or sequence level data;

if the first information-sharing flag indicates sharing:

determining common information of an in-loop filter corresponding to one of a sample adaptive offset filter, an adaptive loop filter, a linear spatial filter and a deblocking filter in the picture level data or the sequence level data, wherein said common information comprises at least partial filter parameters of the in-loop filter and said at least partial filter parameters of the in-loop filter includes filter coefficient or offset value associated with the in-loop filter;

determining filter information of the in-loop filter for one or more slices of a picture, wherein at least a portion of the filter information is determined from said common information; and applying the in-loop filter using the filter coefficient or the offset value in the common information to one or more slices of the picture.

10. The method of claim 9, wherein the first information-sharing flag is in the picture level data, and said common information is in the picture level data for one or more slices of the picture to share.

11. The method of claim 9, wherein no common information of the in-loop filter is in the picture level data or the sequence level data if the first information-sharing flag indicates no sharing.

\* \* \* \* \*